United States Patent
Wigdahl et al.

(10) Patent No.: US 12,284,942 B2
(45) Date of Patent: Apr. 29, 2025

(54) SENSOR FUSION SYSTEM FOR IMPROVED ACCUMULATOR FILL LEVEL IN A HARVESTER VEHICLE

(71) Applicants: Deere & Company, Moline, IL (US); Iowa State University Research Foundation, Inc., Ames, IA (US)

(72) Inventors: Jeffrey S. Wigdahl, Ames, IA (US); Jeffrey C. Askey, Boone, IA (US); Mark A. Cracraft, Johnston, IA (US); Robert R. Carlson, Slater, IA (US); Grant W. Mandernach, Polk City, IA (US)

(73) Assignees: Deere & Company, Moline, IL (US); Iowa State University Research Foundation, Ames, IA (US)

( * ) Notice: Subject to any disclaimer, the term of this patent is extended or adjusted under 35 U.S.C. 154(b) by 220 days.

(21) Appl. No.: 17/711,575

(22) Filed: Apr. 1, 2022

(65) Prior Publication Data

US 2023/0309447 A1 Oct. 5, 2023

(51) Int. Cl.
*A01D 41/127* (2006.01)
*A01D 41/12* (2006.01)
*A01D 46/08* (2006.01)

(52) U.S. Cl.
CPC ..... *A01D 41/1275* (2013.01); *A01D 41/1208* (2013.01); *A01D 41/1271* (2013.01); *A01D 46/085* (2013.01)

(58) Field of Classification Search
CPC ............ A01D 41/1275; A01D 41/1208; A01D 41/1271; A01D 46/085
See application file for complete search history.

(56) References Cited

U.S. PATENT DOCUMENTS

| | | | |
|---|---|---|---|
| 4,918,910 A * | 4/1990 | Sheehan | A01F 15/0816 100/45 |
| 6,442,916 B1 * | 9/2002 | Pope | A01D 41/1271 56/10.2 R |
| 9,681,605 B2 | 6/2017 | Noonan et al. | |
| 9,854,744 B2 * | 1/2018 | Smith | G05B 15/02 |
| 10,701,861 B2 * | 7/2020 | Gould | A01D 41/1275 |
| 2009/0325658 A1 * | 12/2009 | Phelan | A01D 41/1275 460/6 |

(Continued)

*Primary Examiner* — Jason Holloway
*Assistant Examiner* — Madison B Emmett
(74) *Attorney, Agent, or Firm* — Tucker Ellis LLP

(57) ABSTRACT

One or more techniques and/or systems are disclosed for a harvester vehicle that includes a crop processing system comprising at least an accumulator and a round module builder. The harvester vehicle has a feedback fusion system that operably provides crop processing data indicative of an estimated accumulator fill level to a crop feed rate control system. The feedback fusion system has a plurality of feedback devices that operably provide feedback signals including data indicative of two or more of: crop mass flow, module builder status, module size, and accumulator fill level. The feedback fusion system has a control module that operably receives the feedback signals and generates an accumulator fill level signal based at least upon two or more of the feedback signals. The accumulator fill level signal is indicative of the estimated fill level in the accumulator.

18 Claims, 13 Drawing Sheets

(56) References Cited

U.S. PATENT DOCUMENTS

| | | | |
|---|---|---|---|
| 2010/0285855 A1* | 11/2010 | Chervenka | A01D 41/1275 460/119 |
| 2012/0096827 A1* | 4/2012 | Chaney | A01F 15/0833 56/341 |
| 2014/0237981 A1* | 8/2014 | Roberge | A01D 82/00 198/572 |
| 2016/0165803 A1* | 6/2016 | Smith | G05B 15/02 700/275 |
| 2020/0022305 A1* | 1/2020 | Gould | A01D 41/1208 |
| 2020/0113136 A1* | 4/2020 | Eubanks | A01F 15/0833 |
| 2021/0282318 A1* | 9/2021 | Cracraft | A01F 15/0825 |
| 2023/0194325 A1* | 6/2023 | Schroeder | G01F 23/185 701/50 |

\* cited by examiner

SENSOR FUSION SYSTEM FOR IMPROVED ACCUMULATOR FILL LEVEL IN A HARVESTER VEHICLE

BACKGROUND

When harvesting crops, a harvester vehicle will often temporarily store the harvested crop in an accumulator. Once the accumulator fill level reaches a threshold, the accumulator is unloaded with the stored crop being used to form a crop module such as a bale of cotton or hay. Once the crop module reaches a predetermined size, the module is wrapped and ejected from the harvester vehicle.

An accumulator control system targets to have the accumulator empty when this wrap-and-eject cycle is initiated to provide as much time as possible for the wrap-and-eject cycle to complete to avoid stopping harvest or reducing the ground speed during the cycle. The wrap-and-eject cycle is triggered when the target size for the round module is reached. If the accumulator fill level is inaccurate, then the accumulator may not be empty when wrapping initiates, which can result in overfilling the accumulator during the wrap and eject cycle and subsequent plugging of other crop processing systems on the harvester resulting in decreased harvesting efficiency.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In one implementation, there is provided a harvester vehicle comprising a crop processing system comprising at least an accumulator and a module builder, and a feedback fusion system that operably provides crop processing data indicative of an estimated accumulator fill level to a crop feed rate control system. The feedback fusion system comprises a plurality of feedback devices that operably provide feedback signals comprising data indicative of one or more of: crop mass flow, module builder status, module size, and accumulator fill level. The harvester vehicle also comprises a control module that operably receives the feedback signals and generates an accumulator fill level signal based at least upon two or more of the feedback signals, the accumulator fill level signal indicative of an estimated fill level in the accumulator.

In another implementation, there is provided a method for estimating an accumulator fill level in a harvester vehicle. The harvester vehicle has a crop processing system comprising at least an accumulator and a module builder that operably process a harvested crop, and a feedback fusion system that estimates the fill level in the accumulator of the harvester vehicle by fusing feedback data from a plurality of feedback devices. The method comprises estimating the accumulator fill level in the harvester vehicle by operably providing crop processing data indicative of an accumulator fill level to the fusion feedback system. The crop processing data indicative of the accumulator fill level is used by the feedback fusion system to operably control activation and deactivation of a wrap-and-eject cycle. Estimating the accumulator fill level comprises generating an accumulator fill level signal indicative of the estimated fill level in the accumulator. The accumulator fill level signal is based at least on two or more feedback signals received from the plurality of feedback devices, the feedback signals comprising data indicative of: crop mass flow, module builder status, module size, and accumulator fill level. Estimating the accumulator fill level comprises wrapping and ejecting a completed crop module from the module builder based at least on the estimated accumulator fill level signal.

In another implementation, there is provided a system for estimating the accumulator fill level of a vehicle harvester. The system comprises a crop processing system comprising at least an accumulator and a round module builder; and a feedback fusion system that operably provides crop processing data indicative of an accumulator fill level to a crop feed rate control system. The feedback fusion system comprises a plurality of feedback devices. The plurality of feedback devices comprises: at least one of the feedback devices is configured to detect the accumulator fill level and to operably provide a feedback signal comprising data indicative of the fill level within the accumulator; at least one of the feedback devices is configured to monitor crop mass flow into the accumulator and to operably provide a feedback signal comprising data indicative of the crop mass flow into the accumulator; at least one of the feedback devices is configured to detect size of the crop module and to operably provide a feedback signal comprising data indicative of the crop module size; at least one of the plurality of feedback devices is configured to monitor module builder status and to operably provide a feedback signal comprising data indicative of the module builder status, wherein the module builder status comprises data indicating the stage of module formation which can be used to perform module mass correction. The feedback fusion system further comprises a control module that operably receives the feedback signals and generates an accumulator fill level signal based at least upon two or more of the feedback signals, the accumulator fill level signal indicative of the estimated fill level in the accumulator. The crop processing system wraps and ejects a completed module from the module builder based at least on the accumulator fill level signal.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

What is disclosed herein may take physical form in certain parts and arrangement of parts, and will be described in detail in this specification and illustrated in the accompanying drawings which form a part hereof and wherein.

DETAILED DESCRIPTION

Figure 1:
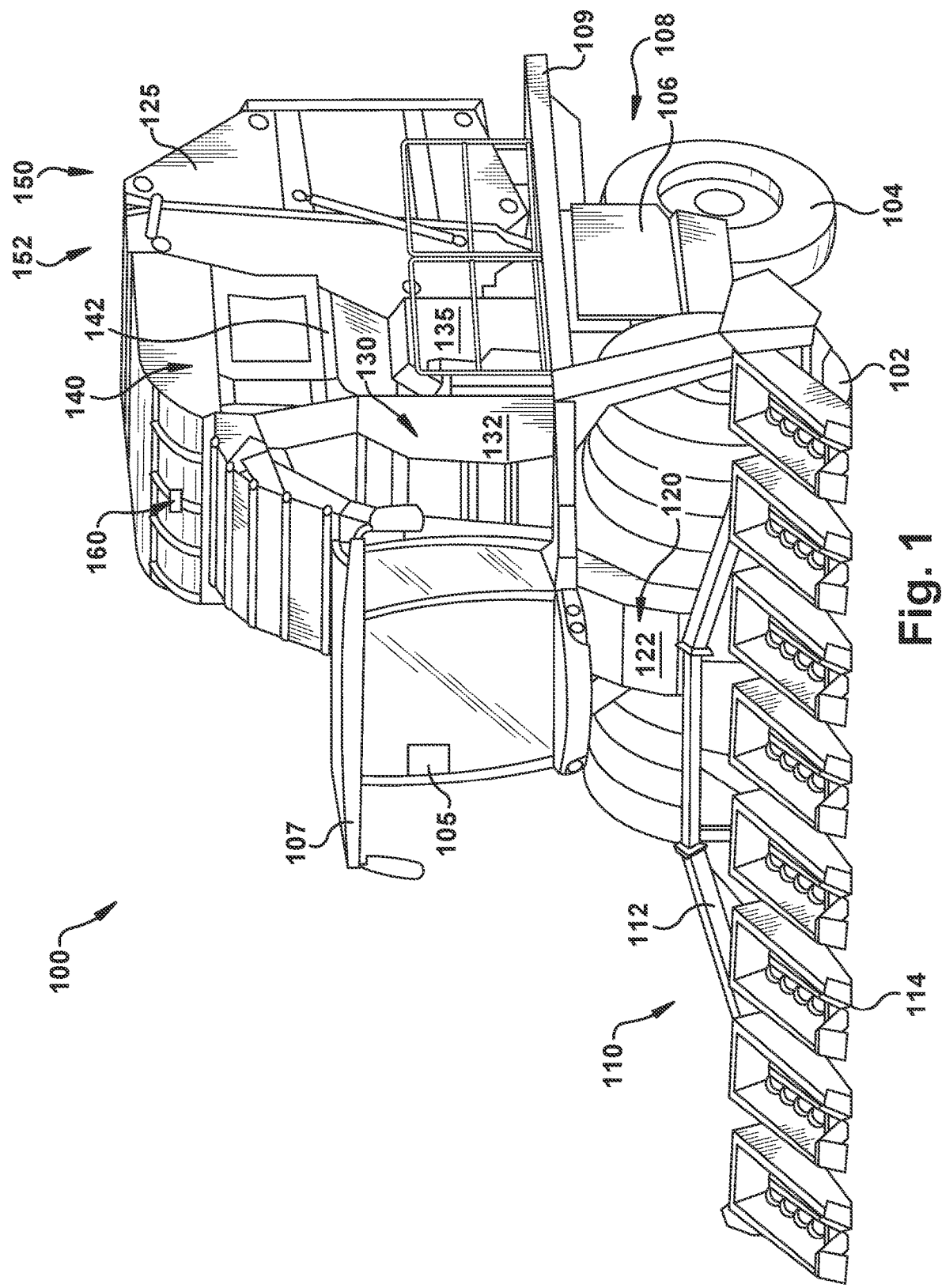
FIG. 1 is a component diagram illustrating a perspective view of a harvester according to one implementation.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

A system can be devised that provides improved accuracy in estimating the crop level in the accumulator (also referred to herein as the accumulator fill level). The system disclosed herein accomplishes this by combining the inputs from other systems to provide a more accurate, reliable indication of the amount of crop in the accumulator. As an example, the system can fuse feedback from one or more of the following: existing lower and upper level sensors in the accumulator; one or more mass flow sensors used for yield mapping; the size of the crop module and the associated rate at which it is changing (e.g., the growth rate); and the machine status of feeder operation. By taking into account data from multiple inputs above, the crop level in the accumulator can be estimated with greater accuracy and reliability. A more accurate accumulator fill level can provide the most efficient operation of the harvester vehicle resulting in the highest productivity.

Figure 2:
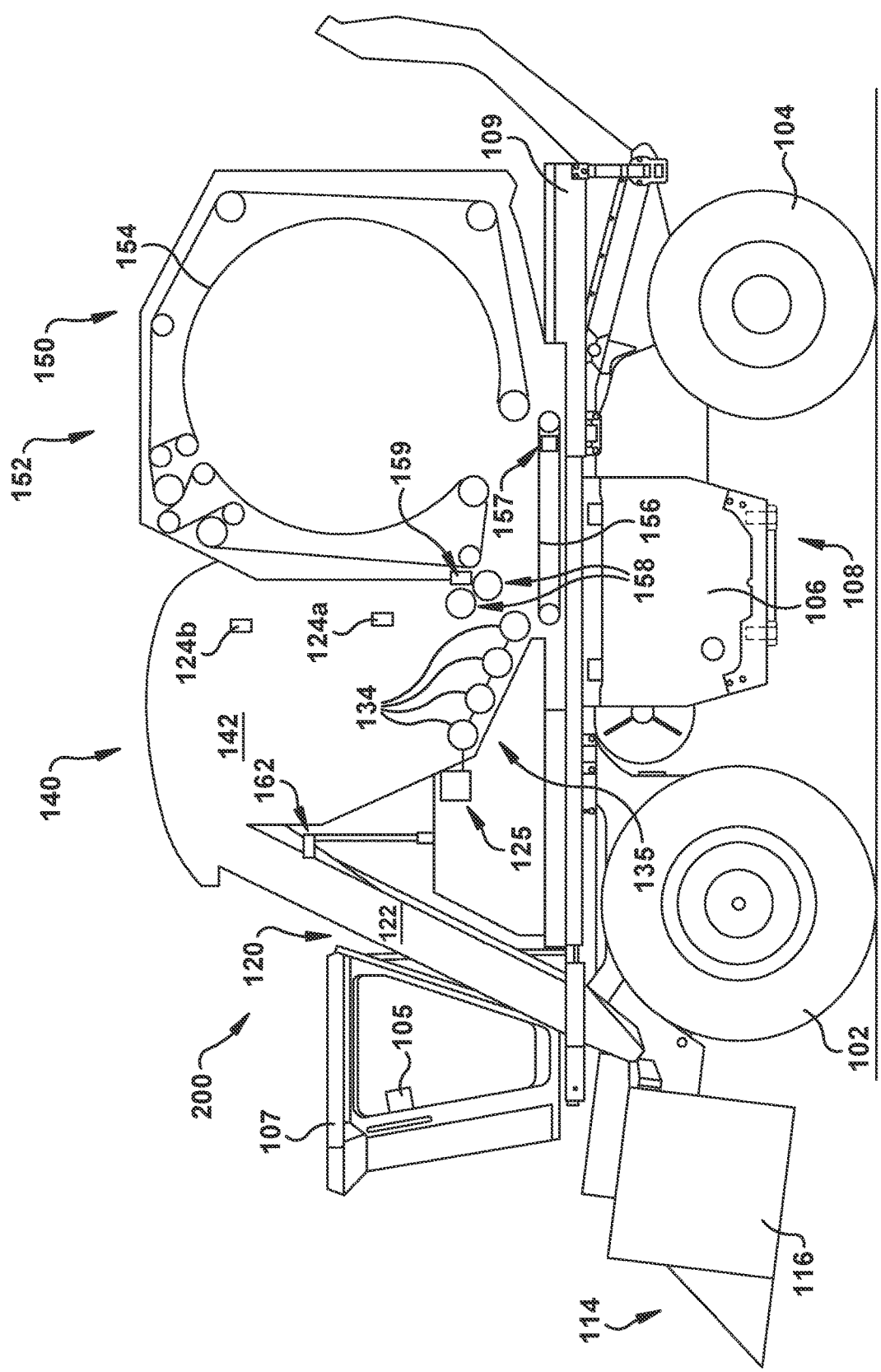
FIG. 2 is a component diagram illustrating a side view of a harvester according to another implementation.

Referring now to FIGS. 1 and 2, which each illustrate examples of a harvester vehicle 100, 200. In these examples, the harvester vehicle 100, 200 is a cotton harvester (e.g., cotton picker 200 or a cotton stripper 100), but other types of harvesters are contemplated by this disclosure such as a combine.

The harvester vehicle 100 comprises a chassis 109 that is supported by front wheels 102 and rear wheels 104 although other support is contemplated such as tracks. The harvester vehicle 100 is adapted for movement through a field to harvest crops (e.g., cotton, corn, stover, hay, wheat, alfalfa, etc.).

An operator station 107 is supported by the chassis 109. An operator interface 105 is positioned in the operator station 107. A power module 108, such as an engine 106, can be supported below the chassis 109. Water, lubricant, and fuel tanks (not shown) may be supported in and on the chassis 109.

A crop harvesting device 114 is coupleable to the chassis 109. The crop harvesting device 114 can be configured to remove cotton from a field. The harvesting device 114 can comprise a cotton stripper header 112 (FIG. 1), one or more cotton picking units 116 (FIG. 2), or another harvesting structure (e.g., corn head, or other crop heads). Alternatively, the harvesting device 114 can be configured to remove corn, or other crops. The harvesting device 114 has different configurations (e.g., sizes, dimensions, etc.) depending on the type of crop being harvested and the manner of removing the crop from the field. In some implementations, the harvester vehicle 100 is a cotton stripper equipped with a crop harvesting device 114 that is adapted to remove, or strip, cotton (e.g., both open and unopened bolls) from the plant. In other implementations, the harvester vehicle 200 is a cotton picker equipped with a crop harvesting device 114 that is adapted to remove, or pick, the cotton from open bolls and leave the bur on the plant.

In some implementations, the harvester vehicle 100 comprises a header system 110. The header system 110 can comprise a crop header component that operably harvests a crop from a target field, a hydraulic motor or electric motor (not shown), and one or more sensors. In some implementations, the crop header component can comprise a header 112 (e.g., a cotton stripper). It will be appreciated that some implementations of a cotton picker can comprise a header or header-equivalent feature (e.g., 116 in FIG. 2). In these implementations, the concept and operation of a header system, for example header system 110 discussed below with respect to a cotton stripper, also generally applies to a cotton picker. But, for the purpose of brevity and for ease understanding, the disclosure provided below refers to example implementations comprising a header system 110 implemented on a cotton stripper.

For implementations of the header system 110 that comprise a hydraulic motor, a hydraulic pump on the harvester vehicle 100 can drive the hydraulic motor on the header 112. In these implementations, the hydraulic motor can supply the power to rotate a shaft that drives individual harvesting units as well as cross augers that deliver cotton to the harvester vehicle 100. In other implementations, the electric motor can supply the power to rotate a shaft that drives individual harvesting units as well as cross augers that deliver cotton to the harvester vehicle 100.

In some implementations, the harvester vehicle 100 comprises an air system 120. The air system 120 can comprise a crop conveyor component that conveys the crop through the harvester vehicle 100, one or more sensors 160, 162, and a crop conveyor device (e.g., one or more air ducts and an air flow generator). In some implementations, the crop conveyor component can comprise one or more air ducts 122.

In some implementations, the air system 120 can be operably coupled to, and in communication with, the header system 110. In these implementations, the air duct 122 is coupled to, and aligned with, the header 112 so that the cotton stripped by the header 112 can be transported into the harvester vehicle 100 (e.g., a cleaner) through the air ducts 122 of the air system 120 powered by air flow (e.g., an air generator).

The one or more sensors 160, 162 can be configured to monitor air flow and/or crop mass flow in the air ducts 122 of the air system 120. In some implementations, one or more sensors can be positioned in the air ducts 122. As an example, a harvester 100, such as a cotton stripper, may include a plurality of mass flow sensors 160, such as four cotton mass flow sensors, that are mounted across the width of the air ducts 122. In other implementations, one or more sensors can be positioned adjacent the air ducts 122. As an example, a harvester 200, such as a cotton picker, may include a plurality of mass flow sensors 162 that are mounted behind the air ducts 122 with one cotton mass flow sensor mounted per row unit. The air flow, and/or crop mass flow, can be monitored using various types of sensors such as, but not limited to, a Harvest Doc™ (HDOC) yield monitor, a vacuum sensor, an air speed sensor, etc. As an example, the HDOC yield monitor is a microwave based controller that bounces a signal off a flowing crop to detect a change in velocity with a slowing crop flow indicative of an air duct 122 being overloaded.

In some implementations, the harvester vehicle 100 comprises a cleaner system 130. The cleaner system 130 can comprise a crop cleaner component that operably cleans the harvested crop, a hydraulic motor or electric motor (not shown), and one or more sensors. In some implementations, the crop cleaner component can comprise a cleaner 132. The cleaner 132 can be provided to clean cotton from the cotton stripper header 112 by removing trash and debris. For implementations of the cleaner system 130 that comprise a hydraulic motor, a hydraulic pump on the harvester vehicle 100 can drive the hydraulic motor on the cleaner 132.

In some implementations, the cleaner system 130 can be operably coupled to, and in communication with, the air system 120 and to the header system 110, via the air system 120. In these implementations, the cleaner 132 is coupled to, and aligned with, the air duct 122 so that the cotton stripped by the header 112 can be transported into the cleaner 132 through the air ducts 122 of the air system 120 powered by air flow.

In some implementations, a crop receptacle 152 is coupleable to the air duct system 120. In some implementations, the crop receptacle 152 is a module builder 150 having at least one baler belt 154. As an example, a module builder can be used to build a module of the crop, such as a bale of cotton or hay/straw, etc. In other implementations, the crop may be ejected by the air duct system 120 into an internal hopper, and/or ejected from the harvester into an accompanying holding tank.

The harvester vehicle 100 comprises an accumulator system 140. The accumulator system 140 can comprise a crop accumulator component that operably, temporarily stores the harvested crop and one or more sensors 124. In some implementations, the crop accumulator component can comprise an accumulator 142 and an accumulator capacity monitor. The accumulator 142 is configured to receive cotton, or other crop, harvested by the cotton stripper header 112 (FIG. 1) or the cotton picking units 116 (FIG. 2).

In some implementations, the accumulator system 140 is operably coupled to, and in communication with, the cleaner system 130. In these implementations, the harvested crop can be transported (e.g., powered by air flow from an air generator) from the cleaner 132 into the top of the accumulator 142 such that the accumulator 142 fills from the bottom up.

With reference to FIG. 2, feedback devices, or sensors 124, can be coupled to the accumulator 142 to monitor an accumulator fill level and provide an accumulator fill level signal indicative of the fill level in the accumulator 142. In some implementations, the accumulator has two sensors 124a, 124b that can be arranged, for example, to monitor a low fill level and a high fill level in the accumulator and to provide an accumulator fill level signal indicative of the fill level in the accumulator 142. In other implementations, the accumulator 142 can have three or more sensors that are configured to monitor the accumulator fill level and to provide the accumulator fill level signal indicative of the fill level in the accumulator 142.

In some implementations, the accumulator 142 has a lower sensor 124a and an upper sensor 124b. When the upper sensor 124b is triggered, a signal is provided to the accumulator 142 to empty its crop contents. That is, for example, when the upper sensor 124b detects the accumulator fill level exceeds (e.g., the crop level in the accumulator rises above) the pre-set sensor threshold level, an accumulator empty signal is propagated. In some implementations, the upper sensor 124b can be configured, such as by its position in the accumulator 142, to be triggered before the accumulator 142 is completely full (e.g., having a built in buffer of extra crop accumulation space). Triggering of the lower sensor 124a (e.g., IR sensor) indicates that the accumulator 142 has released a sufficient crop load, and should cease emptying its crop contents. That is, for example, when the lower sensor 124a detects the accumulator fill level exceeds (e.g., the crop level in the accumulator drops below) a pre-set sensor threshold level, emptying of the accumulator 142 can cease. The lower sensor 124a can be configured, such as by its position in the accumulator 142, to mitigate emptying of the crop from the accumulator 142 below a desired low level.

In some implementations, the accumulator system 140 can comprise other sensors to determine an accumulator fill rate and/or fill capacity. In some implementations, multiple sensors can be mounted at an inlet to the accumulator 142 to monitor mass flow rate (e.g., flow rate of the crop through the inlet, or other portions of the conveyor system) and accumulator fill rate. These sensors can be configured to measure the mass flow rate and to measure the time to fill the accumulator 142 between the lower and upper sensors 124a, 124b (e.g., accumulator fill rate) to determine yield.

In some implementations, it is beneficial to determine the mass in the accumulator 142 when the fill level is between the lower and upper sensors 124a, 124b. In these implementations, sensors can monitor the mass flow entering and exiting the accumulator 142 (e.g. which can be based on past accumulator cycles) and incorporate this data with additional timing data. As an example, a bale diameter can be used to determine a bale growth rate, and the bale growth rate can be used to determine the amount of mass from the size of the module diameter thereby creating a better estimation of mass in accumulator 142.

With continued reference to FIG. 2, a feeder 135 is coupleable to the chassis 109. The feeder 135 can be configured to receive cotton, or other crop, from the accumulator 142. The feeder 135 can comprise a plurality of meter rollers 134 configured to compress the cotton, or other crop, and transfer the cotton, or other crop, to the module builder 150 at a feed rate. A first motor 125 is positioned to rotate the plurality of meter rollers 134.

A plurality of beater rollers 158 can be configured to cooperate with the plurality of meter rollers 134 to transfer the crop, such as cotton, to the module builder 150 at the feed rate. A second motor 159 can be positioned to rotate the plurality of beater rollers 158.

A feeder belt 156 can be configured to receive crop from the plurality of meter rollers 134 and beater rollers 158 and transfer the crop to the module builder 150 at the feed rate. A third motor 157 is positioned to rotate the feeder belt 156.

Figure 3:
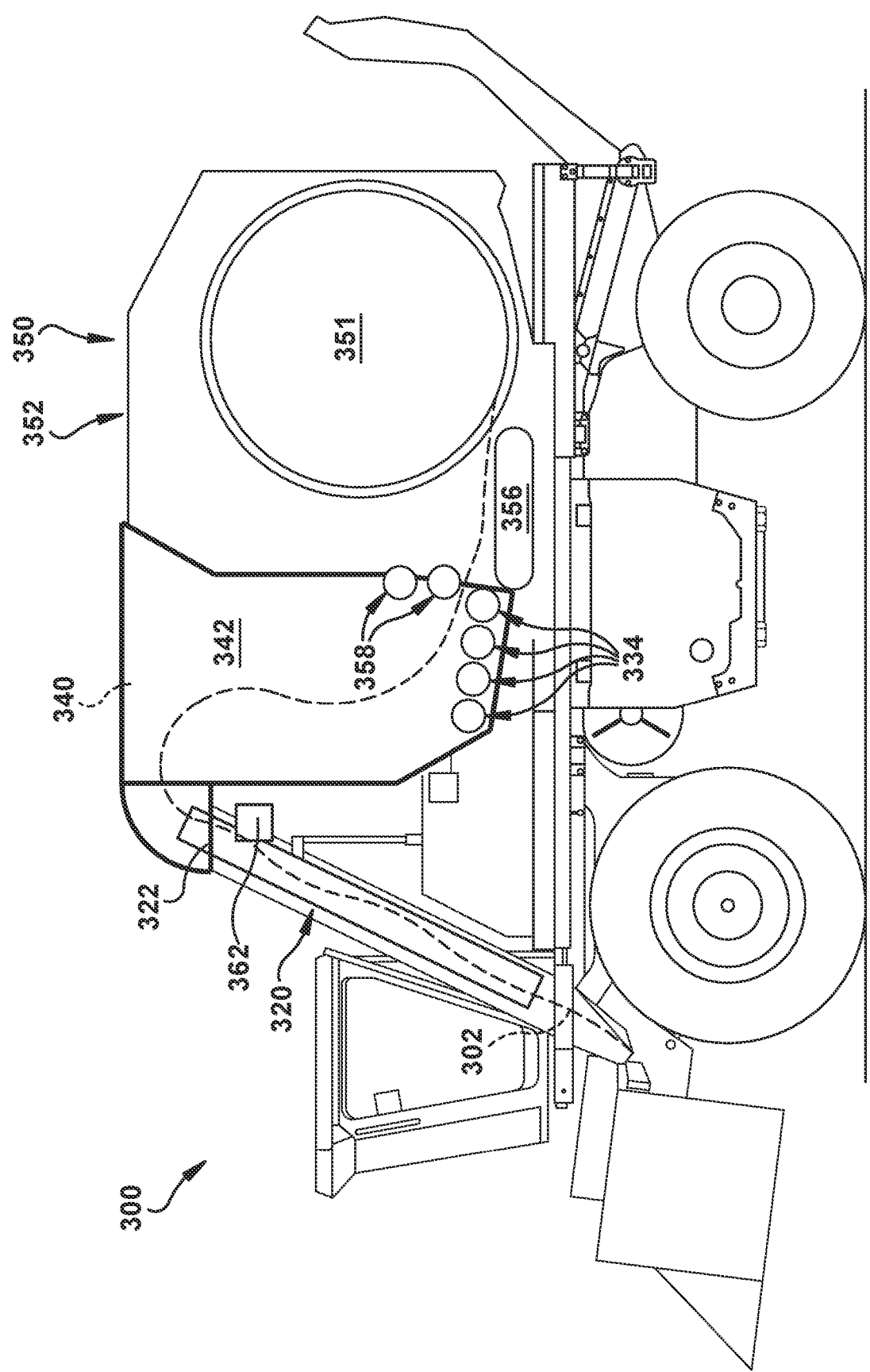
FIG. 3 is a component diagram illustrating a crop feed path through the harvester according to the implementations in FIGS. 1 and 2.

FIG. 3 illustrates the travel path 302 of a harvested crop, such as cotton, through a harvester vehicle 300 such as those shown in FIGS. 1 and 2 for formation into a crop module. In this implementation, the harvester vehicle 300 is a cotton harvester (e.g., cotton picker), but other types of harvesters are contemplated by this disclosure.

After being harvested, the cotton travels along a path 302 for processing by components of the harvester 300. In some implementations, an air system 320 receives the harvested crop. The air system 320 can comprise a crop conveyor component that conveys the crop through the harvester vehicle 300, one or more sensors 362, and a crop conveyor device. In this implementation, the crop conveyor device comprises one or more air ducts 322 through which the crop travels along the cotton processing path 302 assisted by air flow provided by an air flow generator (e.g., a fluid source). The air system 320 is responsible for transporting the crop material along the path 302 to the accumulator system 340 where the cotton is fed into the top of the accumulator 342 such that the accumulator 342 fills with cotton from the bottom up.

The accumulator system 340 and, in particular the accumulator 342, is configured to receive cotton, or other crop, harvested by the cotton stripper header (e.g., 112 of FIG. 1) or the cotton picking units (e.g., 116 of FIG. 2). The accumulator 342 is configured to operably, temporarily store the harvested crop. In some implementations, the accumulator 342 can include an auger to facilitate the distribution of crop material while the accumulator 342 is filling and emptying. As will be explained in more detail below with reference to FIGS. 4A and 4B, the accumulator system 340 comprises one or more sensors coupled to the accumulator 342.

In this implementation, the harvester 300 further comprises a plurality of meter rollers 334 and a plurality of beater rollers 358. The plurality of meter rollers 334 are configured to compress the cotton, or other crop, and transfer the cotton, or other crop, to the module builder 350 at a feed rate. The plurality of beater rollers 358 are configured to cooperate with the plurality of meter rollers 334 to transfer the crop to the module builder 350 at the feed rate. A feeder conveyor, or feeder belt 356, can be configured to receive crop from the plurality of meter rollers 334 and beater rollers 358 and transfer the crop to the module builder 350 at the feed rate.

In some implementations, the crop receptacle 352 comprises a module builder 350 that can be configured to build a crop module, such as a bale of cotton or hay/straw, etc.

Figure 4A:
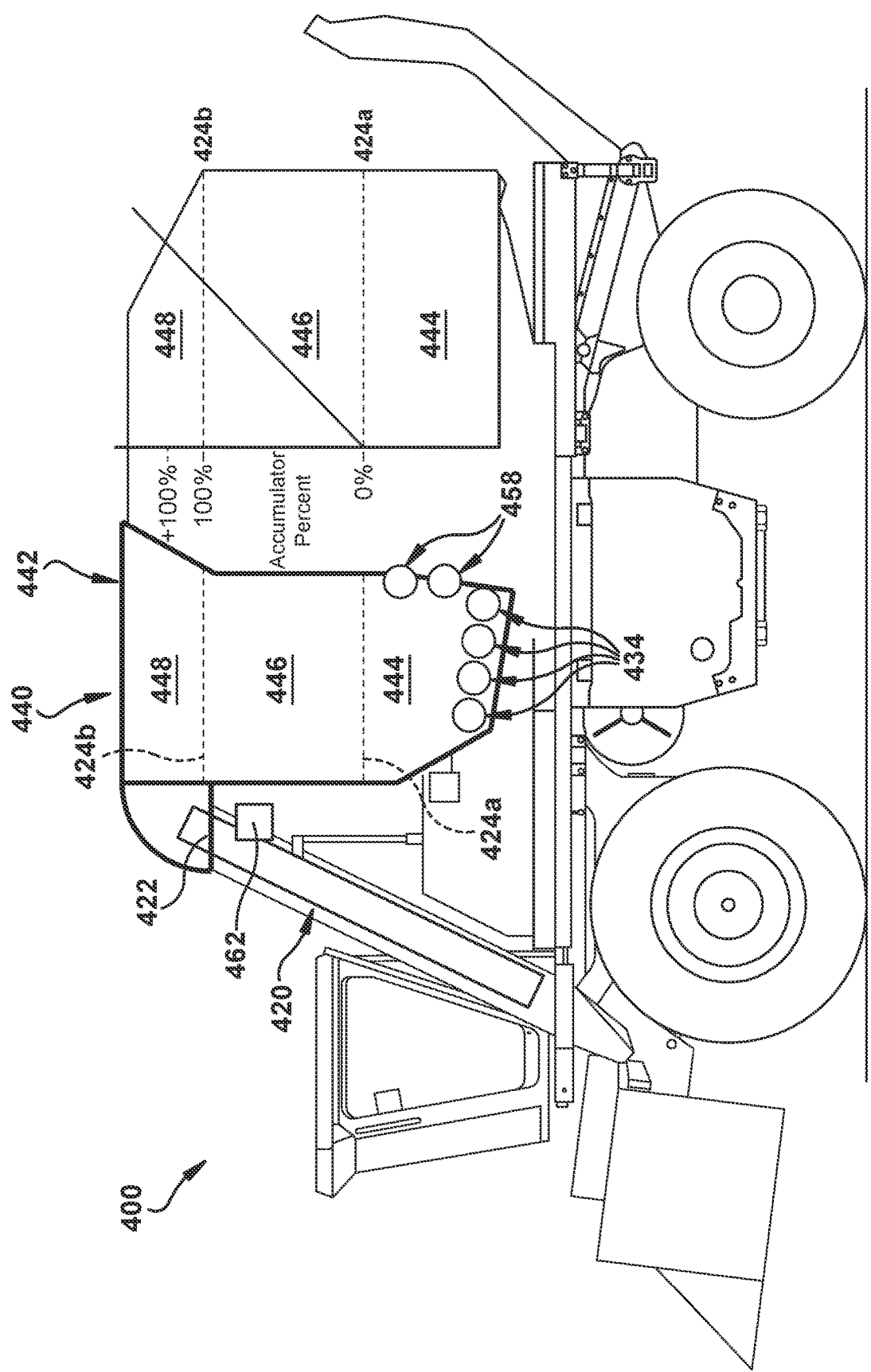
FIG. 4A is a component diagram illustrating one or more crop processing systems according to the harvester of FIGS. 1 and 2.
Figure 4B:
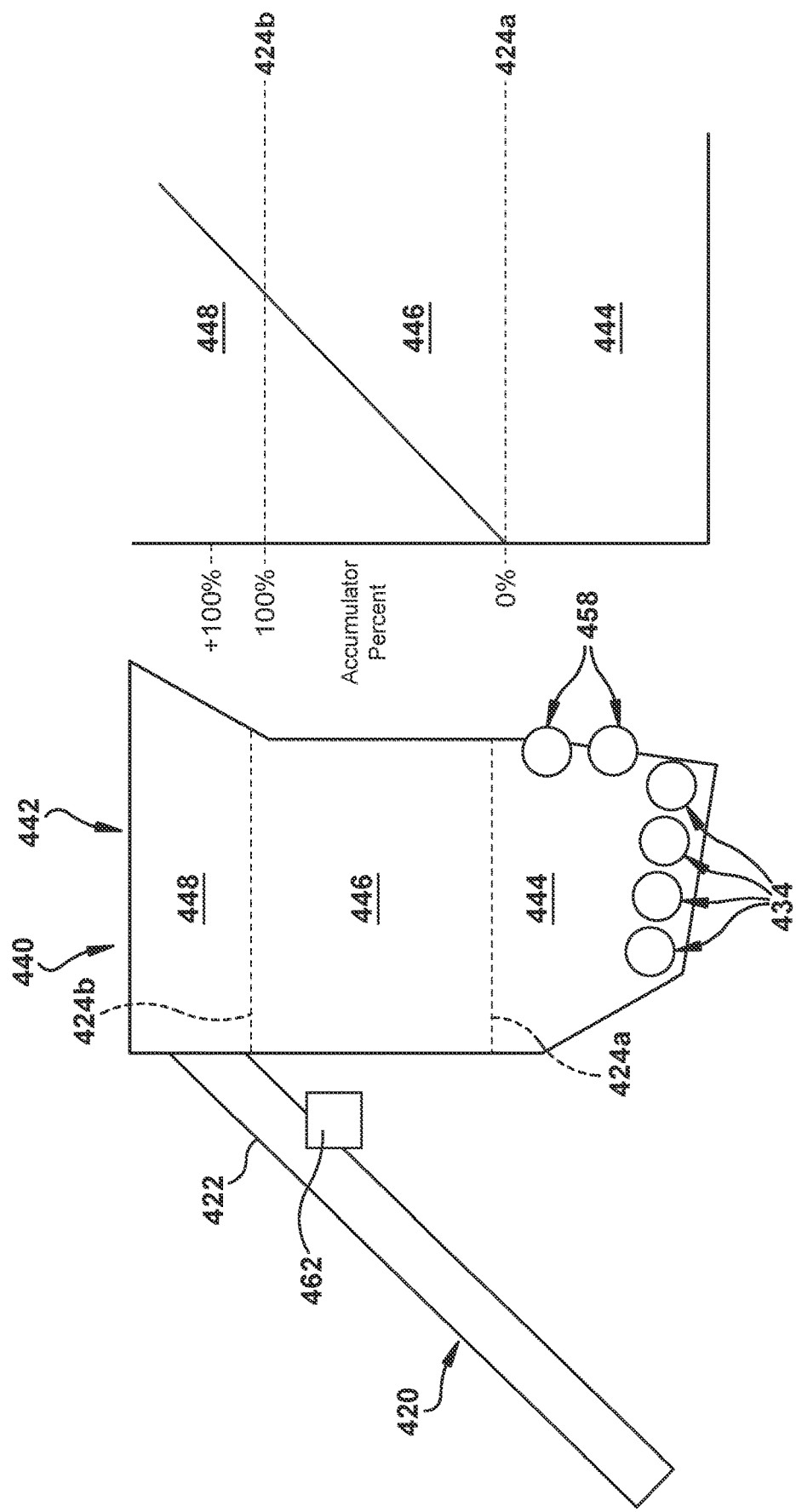
FIG. 4B is an exploded view of the component diagram illustrated in FIG. 4A.

FIG. 4A is a component diagram illustrating one implementation of a harvester vehicle 400 in accordance with this disclosure. In this implementation, the harvester vehicle 400 includes an accumulator system 440 comprising an accumulator 442 and a pair of sensors 424a, 424b that are coupled to the accumulator 442. The sensors 424a, 424b can be configured to monitor the crop level within the accumulator (e.g., the accumulator fill level) and to provide an accumulator fill level signal indicative of the fill level within the accumulator 442. The sensors 424a, 424b can be any type of sensor capable of detecting the fill level in the accumulator 442. In some implementations, the accumulator 442 includes a lower sensor 424a disposed in a lower portion of the accumulator 442 that is configured to detect when the crop level in the accumulator 442 falls below a low-level threshold and an upper sensor 424b disposed in an upper portion of the accumulator 442 that is configured to detect when the crop level in the accumulator 442 rises above a high-level threshold.

In some implementations, the sensors can divide the accumulator into virtual zones or regions. In this implementation, the lower sensor 424a and upper sensor 424b together divide the accumulator 442 into three virtual zones or regions. As an example, the accumulator 442 can comprise a lower-level 444, a mid-level 446, and an upper-level 448.

The lower-level 444 consists of the area in the accumulator 442 below the lower sensor 424a that is defined by a region extending between the bottom (e.g., floor) of the accumulator 442 and the lower sensor 424a. The accumulator 442 is considered to indicate a low fill level, for example 0% capacity full, when the crop fill level in the accumulator 442 is beneath the lower sensor 424a. The mid-level 446 consists of the region extending between the lower sensor 424a, which is considered to indicate the low fill level (e.g., 0% capacity full), and the upper sensor 424b, which is considered to indicate a high fill level, for example 100% capacity full. The mass of crop material disposed in the mid-level 446 between the lower sensor 424a and the upper sensor 424b is defined as the mid-level mass. The upper-level 448 consists of the region extending between the upper sensor 424b and the top (e.g., ceiling) of the accumulator 442. The upper-level 448 is a region above the upper sensor 424b in which the accumulator is considered to indicate the high fill level (e.g., 100% capacity full). In some implementations, the accumulator 442 has additional capacity available in the area above the upper sensor 424b, such that it is possible for the accumulator 442 to exceed 100% capacity full depending on the amount of crop material disposed above the upper sensor 424b in the upper-level 448.

The lower and upper sensors 424a, 424b may each comprise a plurality of sensors. In some implementations, a plurality of lower sensors are aligned front-to-back in the accumulator 442 for the purpose of facilitating an even distribution of cotton at the bottom of the accumulator 442 over the meter rollers 434.

In other implementations, the accumulator 442 includes three or more sensors that are arranged in the accumulator 442 and configured to detect the crop level in the accumulator 442. In these implementations, the sensors can divide the accumulator into more than 3 virtual zones or regions.

Figure 5A:
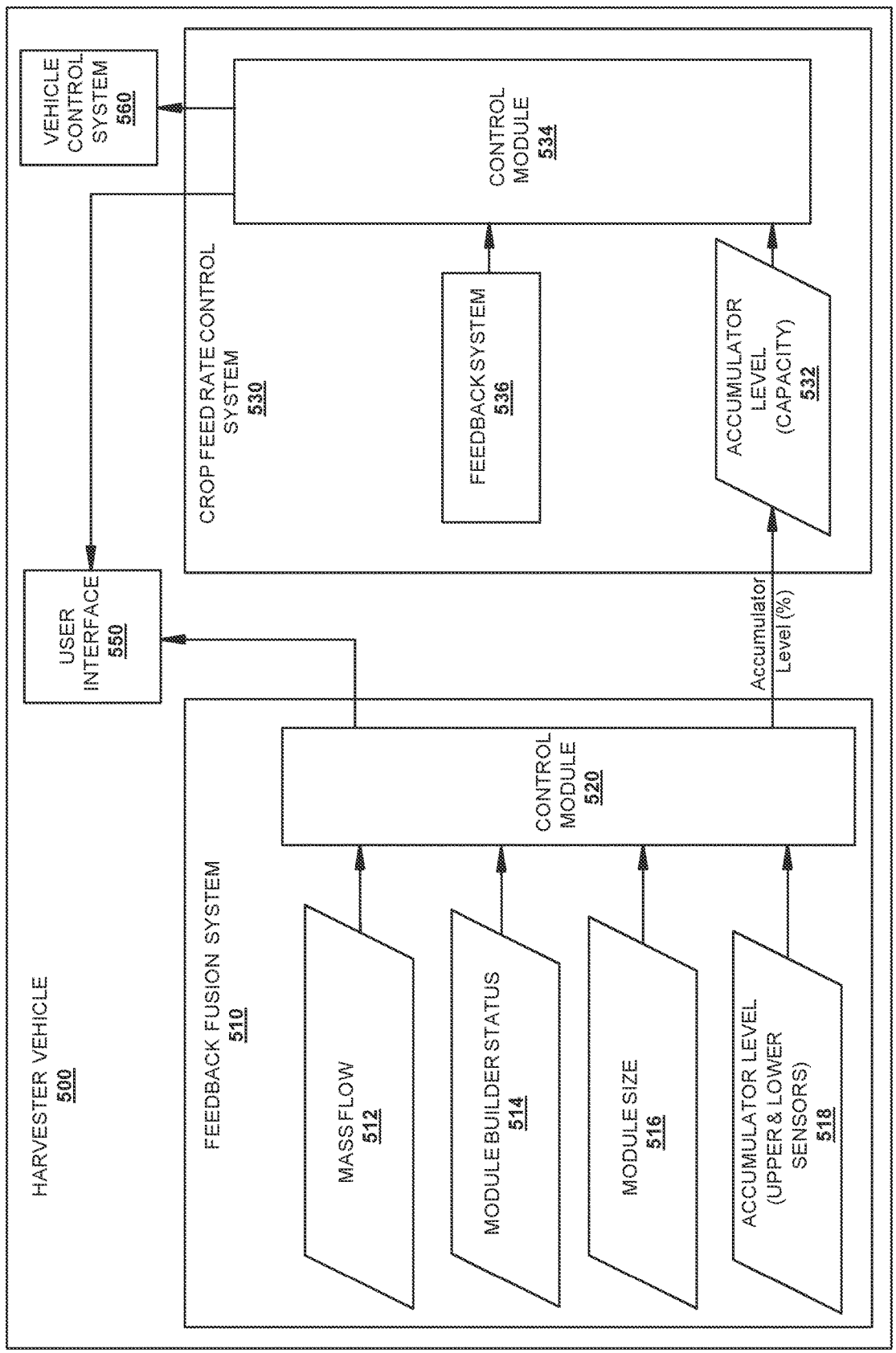
FIG. 5A is a block diagram illustrating one implementation of the harvester from FIGS. 1 and 2 comprising a feedback fusion system for determining accumulator fill level in accordance with this disclosure.

FIG. 5A is a block diagram illustrating one implementation of a harvester vehicle 500 (e.g., 100, 200 from FIGS. 1 and 2) comprising a feedback fusion system 510 for determining an accumulator fill level in accordance with this disclosure. The harvester vehicle 500 comprises a crop processing system comprising at least an accumulator and a module builder. The feedback fusion system 510 is operably coupled with a crop feed rate control system 530 of the harvester vehicle 500. The feedback fusion system 510 operably provides crop processing data indicative of the accumulator fill level 532 to a crop feed rate control system 530. The crop feed rate control system 530 operably provides crop processing data indicative of a target harvesting rate to a vehicle control system 560, in which the crop processing data indicative of the target harvesting rate is based at least upon the received crop processing data indicative of the accumulator fill level 532. The crop processing data indicative of a target harvesting rate can be used by the vehicle control system 560 to operably control the harvesting rate of the harvester vehicle 500.

The crop feed rate control system 530 can comprise one or more control modules, collectively at 534, operably coupled with one or more feedback systems, collectively at 536, of the harvester vehicle 500, and one or more feedback devices (e.g., sensors) configured to monitor or detect crop processing data (e.g., accumulator level 532, machine mass flow, etc.) associated with crop processing components of the harvester vehicle's crop processing system. The crop processing components can comprise two or more of: a crop accumulator component that operably, temporarily stores the harvested crop, the crop accumulator component comprising an accumulator capacity monitor; a crop header component that operably harvests the crop from a target field, the crop header component comprising a header and a header system load monitor; a crop conveyor component that conveys the crop through the vehicle, the crop conveyor component comprising one or more air ducts and an air system load monitor; a crop cleaner component that operably cleans the harvested crop, the crop cleaner component comprising a cleaner system load monitor; and a map based farming (MBF) component that operably guides movement of the vehicle during harvesting, the MBF component comprising an MBF system monitor.

The one or more feedback systems 536 can operably provide a feedback signal comprising data indicative of a detected load amount for the respective crop processing components of the crop processing system and indicative of a target load amount for one or more of the respective crop processing components of the crop processing system based at least upon the data detected by the feedback devices, as described in application Ser. No. 17/711,384, filed Apr. 1, 2022, the contents of which are incorporated herein by reference in their entireties, except for any definitions, subject matter disclaimers or disavowals, and except to the extent that the incorporated material is inconsistent with the express disclosure herein, in which case the language in this disclosure controls. The target load amount, or target load (%), can be set to a value that correspondingly sets (i.e., controls) the system capacity of a respective feedback system. Hence, the target load (%) can also be referred to as feedback system capacity. In some implementations, the target load (%) is set to maximize the harvesting rate and, by extension, maximize the productivity/throughput.

In some implementations, the one or more control modules 534 can comprise a first control module and a second control module. The first control module operably receives the feedback signal and generates a controlling load signal based at least upon the feedback signal. The controlling load signal can be indicative of a controlling component of the two or more crop processing components of the crop processing system. In some implementations, the first control module, by generating a controlling load signal indicative of a controlling component, can help the crop feed rate control system 530 establish a harvesting rate that loads the controlling component to near its maximum throughput (e.g., optimizing the load), while at the same time mitigating overload of the controlling component, which can result in downtime. The second control module can operably receive a targeted load signal and the controlling load signal with the second control module operably generating the crop processing data indicative of a target harvesting rate for the vehicle that is different than the harvesting rate based at least upon the target load signal and controlling load signal, which takes into account accumulator level (capacity) 532.

In some implementations, the one or more control modules 534 can comprise one or more controllers. The one or more controllers can comprise a processor, a memory device operably coupled with the processor, and logic (e.g., programmable logic) stored in the memory device. In some implementations, the one or more control modules 534 can comprise logic (e.g., programmable logic) that is stored either on a control device of the crop feed rate control system 530 or on another control unit in the harvester vehicle 500. The control module logic can be configured to determine the controlling load and the targeted load based at least upon the feedback signal that the one or more feedback systems operably provide, and to generate the crop processing data indicative of a target harvesting rate (e.g., ground speed) for the harvester vehicle 500.

In these implementations, the one or more control modules 534 of the crop feed rate control system 530 determine which feedback system or crop processing component is limiting the harvesting rate (e.g., ground speed) of the harvester. As an example, the one or more control modules 534 can be configured to determine, based at least upon the feedback signals, which respective crop processing component (e.g., or crop processing components) has the most limiting effect on the harvesting rate (e.g., slowing the harvesting rate and reducing throughput). The one or more control modules 534 can operably generate the crop processing data indicative of a target harvesting rate for the harvester vehicle 500 that is different than the harvesting rate. In this manner, the one or more control modules 534 can help the crop feed rate control system 530 establish a harvesting rate that loads the controlling component to near its maximum throughput (e.g., optimizing the load), while at the same time mitigating overload of the controlling component, which can result in downtime.

In some implementations, the crop feed rate control system 530 can be operably coupled with a user interface 550. The user interface 550 can be configured to display information about the status of the crop feed rate control system 530. In some implementations, the user interface 550 can be an interactive display. In some implementations, the operator can review the vehicle speed signal provided by the second control module 534 to the vehicle control system 560 and can manually override the suggested vehicle speed to overcome the automatic adjustment of the harvesting rate.

The feedback fusion system 510 comprises a control module 520 that operably receives feedback signals from a plurality of feedback devices and generates an accumulator fill level signal based at least upon two or more of the feedback signals. The accumulator fill level signal is indicative of an estimated fill level (e.g., crop level) in the accumulator. In some implementations, the crop processing system wraps and ejects a completed module from the module builder based at least on the accumulator fill level signal.

In some implementations, the plurality of feedback devices, or sensors, operably provide feedback signals comprising data indicative of one or more of: crop mass flow 512, module builder status 514, module size (e.g., module diameter) 516, and accumulator fill level 518. But, the skilled person will appreciate that the number of feedback devices operably coupled with the control module 520 can vary depending on the specifications of the harvester vehicle 500 (e.g., cotton stripper, cotton picker, combine, etc.). In some implementations, the feedback fusion system 510 generates the accumulator fill level signal indicative of the estimated fill level in the accumulator at least based upon the feedback signals comprising data indicative of crop mass flow 512 and accumulator fill level 518.

The feedback fusion system 510 of this disclosure can provide a more accurate estimation of crop fill level in the accumulator by combining, or fusing, the data received from each of the plurality of feedback devices. A more accurate estimation of accumulator fill level is advantageous to help reduce, or even prevent, the overfilling the accumulator which can lead to plugging (e.g., of the cleaner) and machine downtime. As an example, during a wrap-and-eject cycle, a user can be more confident in relying on the estimated accumulator fill level to manually control (e.g., reduce vehicle ground speed to reduce harvesting rate) the harvesting rate of the harvester 500 to avoid overfilling the accumulator. Alternatively, during the wrap-and-eject cycle the harvester 500 can rely on the more accurate estimation of accumulator fill level to automatically control the harvesting rate (e.g., reduce vehicle ground speed to reduce harvesting rate) to maximize productivity and simultaneously avoid overfilling the accumulator.

In some implementations, the control module 520 can comprise a controller, such as a microcontroller. The controller can comprise a processor, a memory device operably coupled with the processor, and logic (e.g., programmable logic) stored in the memory device, the logic configured to generate the accumulator fill level signal based at least upon the feedback signals. In some implementations, the control module 520 can comprise logic (e.g., programmable logic) that is stored either on a control device of the feedback fusion system 510 or on another control unit in the harvester vehicle 500. Thus, in some implementations, the control module 520 is a standalone controller. In other implementations, the control module 520 is integrated into already-existing controllers in the harvester vehicle 500.

In some implementations, the control module 520 can comprise one or more accumulator capacity algorithms configured to process the feedback signals and generate the accumulator fill level capacity feedback signal. In some implementations, the accumulator capacity algorithm estimates the accumulator fill level capacity by taking into account crop mass information from present and past data. In some implementations, the accumulator capacity algorithm monitors crop flow in to the accumulator via one or more mass flow sensors and monitors mass flow out of the accumulator via one or more of the following: crop mass in the accumulator, accumulator sensors (e.g., lower sensor and upper sensor), module size (e.g., diameter), and module growth rate.

In some implementations, the control module 520 operably receives feedback signals comprising data indicative of the accumulator fill level 518 from one or more feedback devices (e.g., sensors) configured to detect the accumulator fill level. In some implementations, at least one of the plurality of feedback devices in the feedback fusion system 510 is configured to detect the accumulator fill level 518 (i.e., the crop fill level within the accumulator) and to operably provide an accumulator fill level signal comprising data indicative of the detected fill level within the accumulator. In some implementations, a plurality of feedback devices are coupled to the accumulator and comprise a lower sensor disposed in a lower portion of the accumulator and an upper sensor disposed in an upper portion of the accumulator. In some implementations, if the accumulator fill level indicates the accumulator is approximately full, the harvester vehicle can automatically slow down (e.g. reduce vehicle speed) to avoid overfilling the accumulator and can initiate a wrap and eject cycle in the harvester vehicle (e.g., a cotton harvester). As an example, monitoring the accumulator fill level can be beneficial to mitigate overfilling the accumulator, which can result in machine downtime such as to remove plugs resulting from the crop overflow in the accumulator.

In some implementations, the accumulator includes a lower sensor (e.g., 424a in FIG. 4A) disposed in a lower portion of the accumulator and configured to detect when the crop level in the accumulator falls below a low-level threshold, and an upper sensor (e.g., 424b in FIG. 4A) disposed in an upper portion of the accumulator and configured to detect when the crop level in the accumulator exceeds a high-level threshold. As an example, when the upper sensor is triggered (e.g., blocked) during harvesting, a signal can be provided to the accumulator to empty/unload its crop contents. That is, for example, when the upper sensor detects the accumulator fill level exceeds (e.g., rises above) the pre-set sensor threshold level, an accumulator empty signal is propagated and an accumulator unloading cycle begins. In some implementations, the upper sensor can be configured, such as by its position in the accumulator, to be triggered before the accumulator is completely full (e.g., having a built in buffer of extra crop accumulation space).

As another example, when the lower sensor is triggered (e.g., unblocked) during emptying of the accumulator, a signal can be provided to the accumulator to stop emptying or terminate the unloading cycle. Thus, triggering the lower sensor indicates that the accumulator has released a sufficient crop load (e.g., amount of crop) and should cease emptying crop contents. That is, for example, when the lower sensor detects the accumulator fill level exceeds (e.g., drops below) a pre-set sensor threshold level, emptying of the accumulator can cease.

In some implementations, the lower sensor can be configured, such as by being positioned in the accumulator a distance from the bottom of the accumulator, to mitigate emptying of the crop from the accumulator below a desired low level. It can be advantageous to have a residual amount of crop in the accumulator rather than a completely empty accumulator. Residual crop in the accumulator can mitigate uneven feeding onto the feeder belt that would occur if the accumulator were completely emptied. Residual crop in the accumulator can also mitigate cotton blow through onto the feeder belt through the meter rolls and beater rolls due to positive pressure from a conveying fan.

In some implementations, a wrap-and-eject cycle can be initiated when the crop fill level in the accumulator reaches the lower sensor 424a (e.g., when the lower sensor 424a is triggered) and the crop module size (e.g., module/bale diameter) meets a target threshold size (e.g., a predetermined module/bale diameter). The general strategy is for the control module 520 to initiate the wrap-and-eject cycle when the crop level in the accumulator is at the lower sensor (e.g., considered to indicate a low fill level such as 0% capacity full) to provide as much time as possible for completion of the wrap-and-eject cycle before the accumulator is full to mitigate stopping harvest or reducing machine ground speed during this cycle. If the accumulator is not empty (e.g., at 0% capacity full) when the wrap-and-eject cycle initiates, overfilling of the accumulator can result which can lead to downtime.

In some implementations, the control module 520 operably receives feedback signals comprising data indicative of mass flow 512 from one or more feedback devices (e.g., sensors) configured to monitor the crop mass flow into the accumulator. In some implementations, at least one of the plurality of feedback devices in the feedback fusion system 510 is configured to monitor crop mass flow into the accumulator and to operably provide a feedback signal comprising data indicative of the crop mass flow into the accumulator. As an example, the feedback devices can comprise mass flow sensors (e.g., 160 in FIG. 1 or 162 in FIG. 2) that operably provide a feedback signal comprising data indicative of the crop mass flow into the accumulator. In some implementations, one or more feedback devices can be mounted at an inlet to the accumulator and configured to monitor the crop mass flow rate (e.g., flow rate of the crop through the inlet, or other portions of the conveyor system) and accumulator fill rate. In some implementations, the feedback devices can be configured to measure the mass flow rate and the time to fill the accumulator between the lower and upper sensors (e.g., accumulator fill rate) in order to determine yield. In these implementations, the feedback devices can be used for yield mapping.

In some implementations, the one or more feedback devices can be configured to monitor crop mass flow into the accumulator (e.g., entering the accumulator) from the air ducts of the air system. In some implementations, one or more mass flow sensors can be positioned in the air ducts. As an example, a harvester, such as a cotton stripper, may include a plurality of mass flow sensors, such as four cotton mass flow sensors, that are mounted across the width of the air ducts. In other implementations, one or more mass flow sensors can be positioned adjacent the air ducts. As an example, a harvester, such as a cotton picker, may include a plurality of mass flow sensors that are mounted behind the air ducts with one cotton mass flow sensor mounted per row unit.

The crop mass flow can be monitored using various types of mass flow sensors such as, but not limited to, an HDOC yield monitor, a vacuum/pressure sensor, an optics/laser-based sensor, etc. The mass flow sensors can be radar-based sensors, but are not so limited. As an example, the HDOC yield monitor is a microwave based controller that bounces a signal off a flowing crop to detect a change in velocity with a slowing crop flow indicative of an air duct being overloaded. As another example, vacuum/pressure sensors can measure a pressure differential across the air duct as material flows to estimate the flow of material in the air duct. In some implementations, the feedback fusion system 510 includes active calibration of the mass flow sensors. The skilled person would recognize that active calibration mass flow can provide an accurate estimation of module density and module weight/mass. But, the feedback fusion system 510 of this disclosure can rely on relative relationships such that active calibration of the mass flow sensors is optional, and not required.

In some implementations, the control module 520 operably receives feedback signals comprising data indicative of the module size 516 from one or more feedback devices (e.g., sensors) configured to detect the size of a crop module. In some implementations, at least one of the plurality of feedback devices in the feedback fusion system 510 is configured to detect size of the crop module and to operably provide a feedback signal comprising data indicative of the crop module size. In some implementations, the crop module size comprises a diameter of the crop module and an associated growth rate of the crop module. As will be explained in more detail below, data indicative of the crop module size can be used to determine the crop mass flow out of the accumulator. As an example, the growth rate of the crop module can be used to determine the mass flow out of the accumulator.

In some implementations, the control module 520 operably receives feedback signals comprising data indicative of the module builder status 514, such as a round module builder (RMB) status, from one or more feedback devices. In some implementations, at least one of the plurality of feedback devices in the feedback fusion system 510 is configured to monitor the module builder status and to operably provide a feedback signal comprising data indicative of the module builder status. The module builder status can comprise data indicating the stage of module formation (e.g., whether or not it is the start of module). As an example, when the module builder determines it is not the start of a module, the feedback fusion system 510 can perform module start mass correction to account for the mass of material taken from the accumulator and subsequently incorporated into the module during module formation. As another example, when the module builder determines it is not the start of a module, the feedback fusion system 510 can calculate a module volume growth rate from the change in diameter over a time interval. In some implementations, the feedback fusion system 510 is configured (e.g., operationally set/programmed) to maximize module size, or bale size, by building modules with a target size approximate to the maximum module diameter because there is a fixed amount of plastic wrap available for each crop module. The module builder can be more precise in building modules of a maximum size if the module builder status is known. In some implementations, the maximum module diameter is 94 inches.

The control module 520 can determine from input from other feedback devices the current module diameter and the amount of crop material in the accumulator. By factoring in input from various feedback devices, the control module 520 can determine that enough crop material mass resides in the accumulator to complete the module or bale. Thus, the control module 520 can initiate unloading of the accumulator and begin feeding crop to the module builder without being initiated by the crop fill level in the accumulator reaching the upper sensor (e.g., without triggering the upper sensor).

In some implementations, the control module 520 can initiate a wrap-and-eject cycle based on one or more of: a target crop module size (e.g., a threshold module size) is met; and a target crop module mass (e.g., a threshold module mass) is met. Thus, one trigger for initiating a wrap-and-cycle is reaching a target size for the crop module, such as a round crop module. An additional trigger for initiating a wrap-and-cycle is reaching a target mass of the crop module, such as a round crop module. Providing this alternative triggering mechanism can be significant if the module handling equipment has weight carrying limits. Additionally, the target size and target mass may be used in combination. As an example, the primary trigger can be target size and the secondary trigger can be target mass (e.g., maximum weight target). Such a feature might be beneficial in high moisture harvest conditions where the round modules tend to be much heavier. This may be made possible due to the presence of module weights, or bale weights, now available on a harvester vehicle.

The benefit of the feedback fusion system 510 provided herein is a more robust machine logic that offers a more accurate, reliable indication that the machine accumulator is empty before starting a wrap-and-eject cycle. Thus, the feedback fusion system 510 provides finer control by producing a more accurate accumulator fill level attributable to fusing, or combining, data from multiple feedback devices. Now, the feedback fusion system 510 can determine whether enough mass exists in the accumulator to begin feeding the module builder in order to complete a bale having sufficient module diameter instead of waiting for the upper sensor to be triggered.

In some implementations, it is beneficial to determine the mass in the accumulator when the fill level is between the lower and upper sensors, also referred to as the mid-level mass. In these implementations, sensors can monitor the mass flow entering and exiting the accumulator (e.g. which can be based on past accumulator cycles) and incorporate this data with additional timing data. As an example, a module diameter can be used to determine a module growth rate, and the module growth rate can be used to determine the amount of mass exiting the accumulator (e.g., mass flow out) from the size of the module diameter thereby creating a better estimation of mass in the accumulator.

In some implementations, the feedback fusion system 510 can be operably coupled with a user interface 550. The user interface 550 can be configured to display information about the status of the feedback fusion system 510. As an example, the user interface 550 can display module density, mass flow rate, module growth rate, accumulator fill level, etc. to a user interface 550 for viewing by an operator. In some implementations, the user interface 550 can be an interactive display.

Figure 5B:
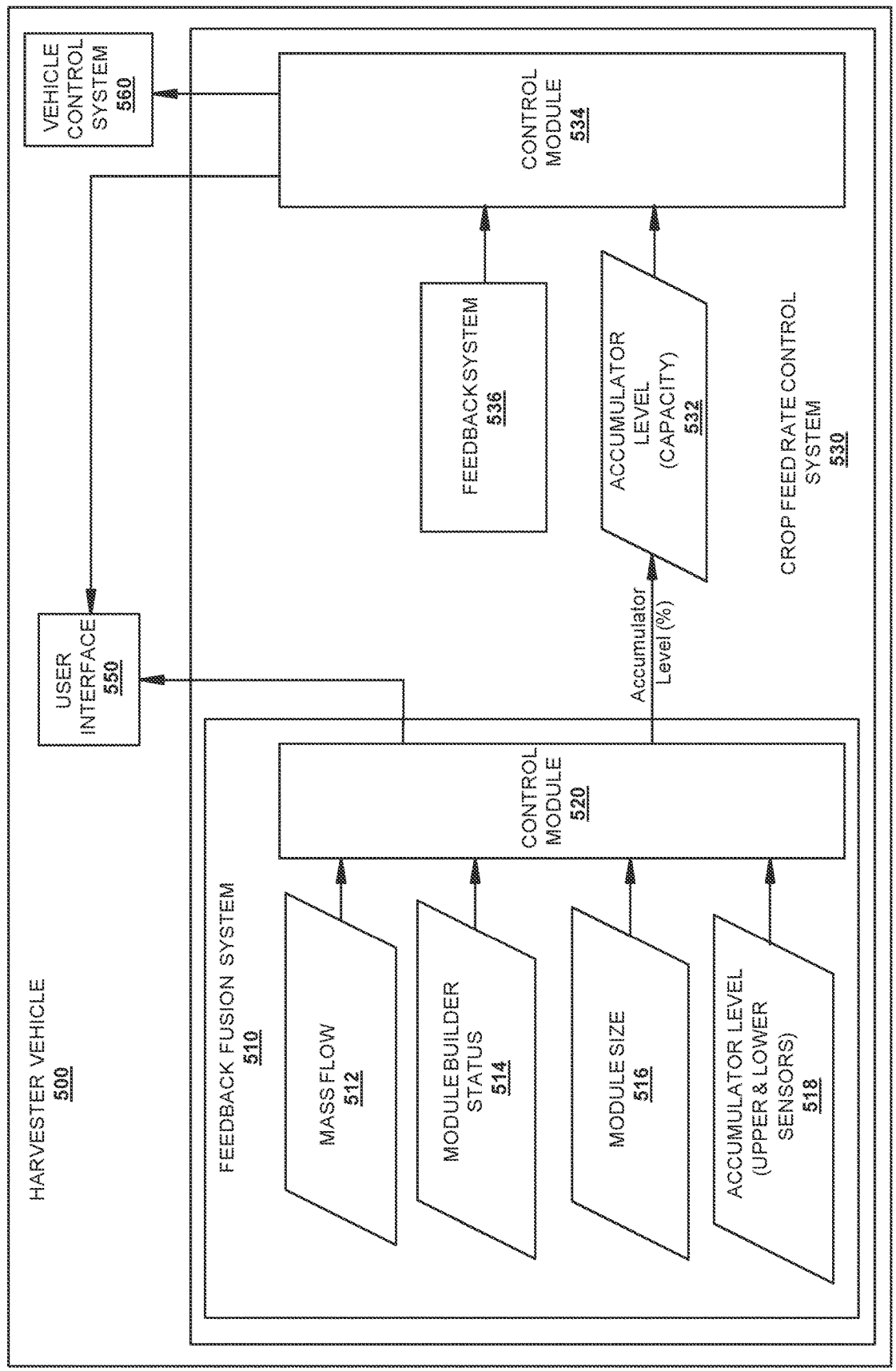
FIG. 5B is a block diagram illustrating another implementation of the harvester from FIGS. 1 and 2 comprising the feedback fusion system for determining accumulator fill level in accordance with this disclosure.

FIG. 5B is a block diagram illustrating another implementation of a harvester vehicle 500 (e.g., 100, 200 from FIGS. 1 and 2) comprising an accumulator feedback fusion system 510 in accordance with this disclosure. In this particular implementation, the feedback fusion system 510 is configured as a sub-system of the crop feed rate control system 530, but operates substantially similar to the accumulator feedback fusion system 510 in FIG. 5A.

Figure 6:
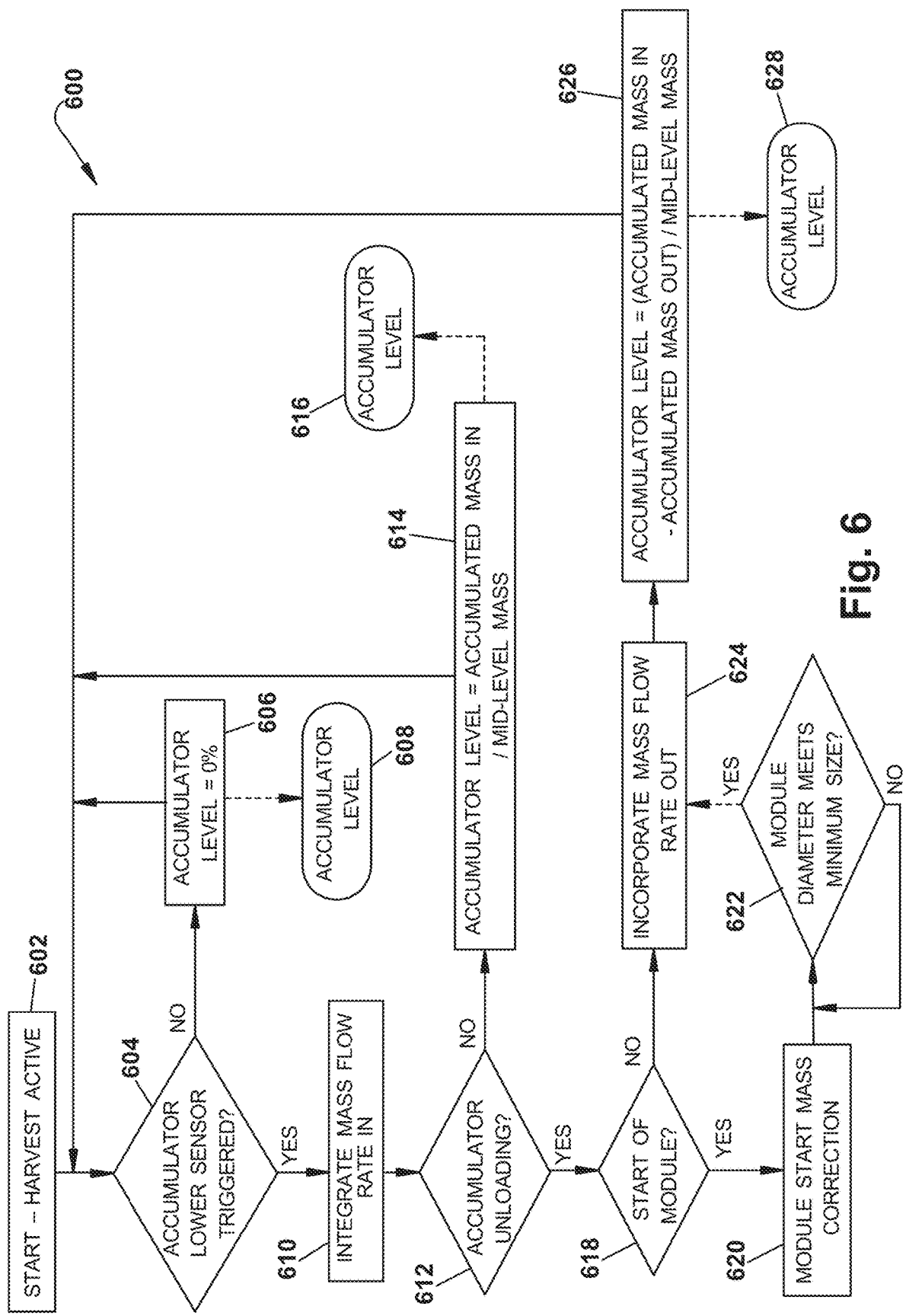
FIG. 6 is a flow diagram illustrating one implementation of an example method for feedback fusion of accumulator fill level data in accordance with this disclosure.

FIG. 6 is a flow diagram illustrating one implementation 600 for estimating the accumulator fill level (i.e., the crop level in the accumulator) in accordance with this disclosure. At 602, the harvester is operational and actively harvesting crop with the harvested crop, such as cotton, transported through the air ducts of the air system and deposited into the top of the accumulator such that the accumulator fills from the bottom up.

At 604, the feedback fusion system monitors the lower sensor to determine whether the lower sensor is triggered (e.g., blocked). As an example, the lower sensor can be triggered when the crop level in the accumulator reaches a sufficient level to block the lower sensor.

At 606, the feedback fusion system sets the accumulator fill level to zero (e.g., 0% capacity full) when the lower sensor is not triggered (e.g., unblocked). As an example, the accumulator fill level is set at 0% capacity full when the crop level in the accumulator is below the threshold level of detection by the lower sensor. At 608, a signal indicative of the accumulator fill level being at 0% capacity full is generated by the feedback fusion system.

At 610, is the step of integrating mass flow rate into the accumulator based on the feedback fusion system determining that the lower sensor is triggered. Integration of the mass flow rate into the accumulator with respect to time provides a value for the mass of crop material (e.g., in kilograms (kg)) that has entered the accumulator.

At 612, the feedback fusion system determines whether the accumulator is unloading. At 614, the accumulator fill level can be calculated, such as by the control module (520 in FIGS. 5A and 5B), according to the following formula: accumulator level=(accumulated mass in)/(mid-level mass), where the accumulated mass in represents the mass of crop material (kg) that has entered the accumulator and the mid-level mass represents the mass of crop material (kg) in the accumulator between the lower sensor and the upper sensor. The accumulator level formula provided at 614, can be used to calculate the accumulator fill level when the accumulator is not unloading. At 616, a signal indicative of the calculated accumulator fill level is generated by the feedback fusion system.

Once the accumulator actually starts unloading crop material, the feedback fusion system can perform a start of the module check. At 618, the start of the module check is carried out to determine whether the accumulator unloading corresponds to the start of a module. The start of the module check provided at 618 is primarily performed because the feedback fusion system uses module diameter as a function of mass flow rate out of the accumulator. In a harvester, the module builder can include a minimum module diameter wherein growth below a certain module diameter is not observed/detected. But, once the feedback fusion system detects a changing module diameter, the feedback fusion system accounts for the mass removed from the accumulator and subsequently incorporated into the crop module.

At 620, the feedback fusion system performs a module start mass correction based on initial module formation. The module start mass correction accounts for the mass of material taken from the accumulator and subsequently incorporated into the module. At 622, the feedback fusion system determines whether the detected module diameter meets a desired, pre-determined size threshold (e.g., minimum threshold of a module diameter). At 623, the feedback fusion system determines that the detected module diameter fails to meet the desired size threshold (e.g., minimum module diameter) and the feedback fusion system returns to step 622 where the feedback fusion system again determines whether the detected module diameter meets the desired size threshold (e.g., minimum module diameter). The step of determining whether the detected module diameter meets a desired size threshold (e.g., minimum module diameter) at 622 continues to be performed until the condition is satisfied (e.g., module diameter exceeds the desired (e.g., minimum) size threshold). The rockshaft for module diameter does not move until a certain module diameter threshold is reached. As an example, once the feedback fusion system determines the module diameter exceeds the minimum size threshold, the rockshaft for the module diameter is moved.

Once it is determined that the module diameter meets the desired size threshold or the module formation is not at the start, the feedback fusion system incorporates the mass flow rate out of the accumulator. At 624, is the step of incorporating the mass flow rate out of the accumulator (e.g., inputting the value), which can be estimated based on module diameter. The mass flow rate out of the accumulator may be a volumetric flow rate that uses the module growth rate and can change in mm/sec. From a mathematical standpoint, integrating mass flow (kg/s) with respect to time out of the accumulator provides an estimated value for the accumulated mass out of the accumulator (kg).

At 626, the accumulator fill level can be calculated according to the following formula: accumulator level= (accumulated mass in−accumulated mass out)/(mid-level mass). In this formula, the accumulator level is a function of the amount of material currently entering the accumulator and the amount of material exiting the accumulator. At 628, a signal indicative of the calculated accumulator fill level is generated by the feedback fusion system. Generally, once it is determined that the accumulator is unloading, the feedback fusion system is continually integrating the mass flow rate in and the mass flow rate out.

Figure 7:
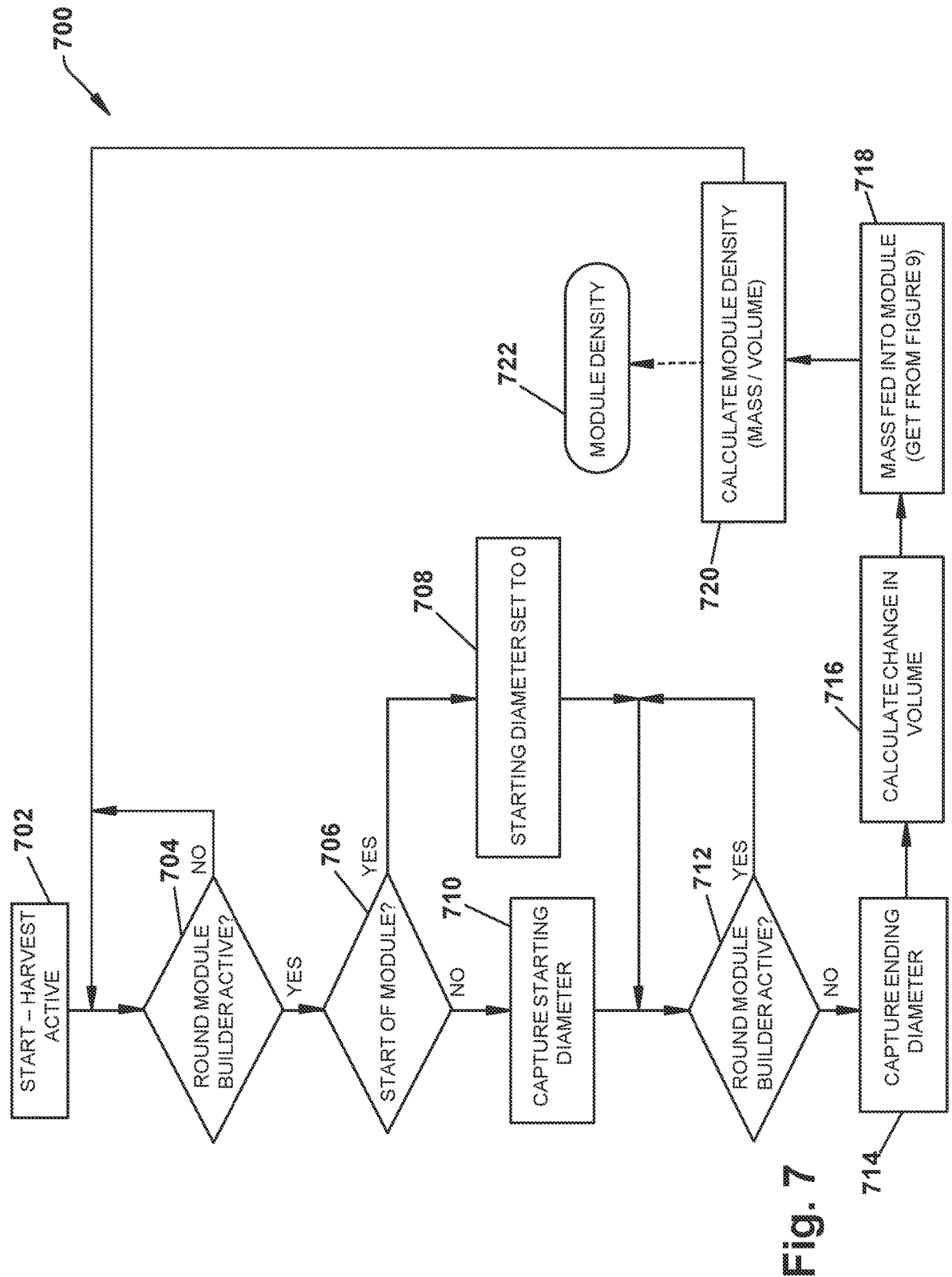
FIG. 7 is a flow diagram illustrating one implementation of an example method for estimating module density in accordance with this disclosure.

FIG. 7 is a flow diagram illustrating one implementation 700 for estimating module density in accordance with this disclosure. At 702, the harvester is operational and actively harvesting crop with the harvester configured to transport the harvested crop from the accumulator into the module builder to form a module.

At 704, there is a check to determine whether the round module builder is active. Once it is determined that a module is being built and the round module builder is active, a start of module check can be performed.

At 706, there is a start of module check. Determining whether it is the start of a module can be based on whether the module size (e.g., bale diameter) is below a predetermined threshold size and whether a wrap-and-eject cycle was recently performed. If it is determined to be the start of a module, the starting module diameter is set to zero at 708.

If it is determined not to be the start of a module, the starting module diameter is captured at 710.

At 712, there is a check to determine whether the round module builder is still active. Once it is determined that the round module builder is inactive (i.e., no longer active), the ending module diameter is captured at 714. At this point, both the starting module diameter and ending module diameter are known. At 716, the change in module volume can be calculated from the change in diameter between the starting module diameter and the ending module diameter.

At 718, the value for the mass fed into the module is acquired from the method implemented in FIG. 9, as will be described in more detail below. The density of the module can be calculated from the amount of mass fed into the module and the corresponding change in the volume of the module due to the mass.

At 720, is the step of calculating the density (mass/volume) of the crop module formed from one accumulator unloading cycle. The calculation provides an estimate of module density that can be used to perform other calculations, such as estimating the accumulator fill level. At 722, a signal indicative of the module density is generated by the feedback fusion system. The module density estimation procedure is advantageous because it provides the module density value in terms of a mass flow rate out of the accumulator rather than a volumetric flow rate out of the accumulator. Additionally, the module density estimation described above takes into account the density changes that occur throughout the course of module formation. As a result, the module density estimation is accurate and up-to-date. Therefore, while the module density estimation could be simplified by using total module weight, total module diameter, and total module volume, such an estimation would be less accurate because it fails to take into account that the density of the module changes throughout the course of module formation.

Figure 8:
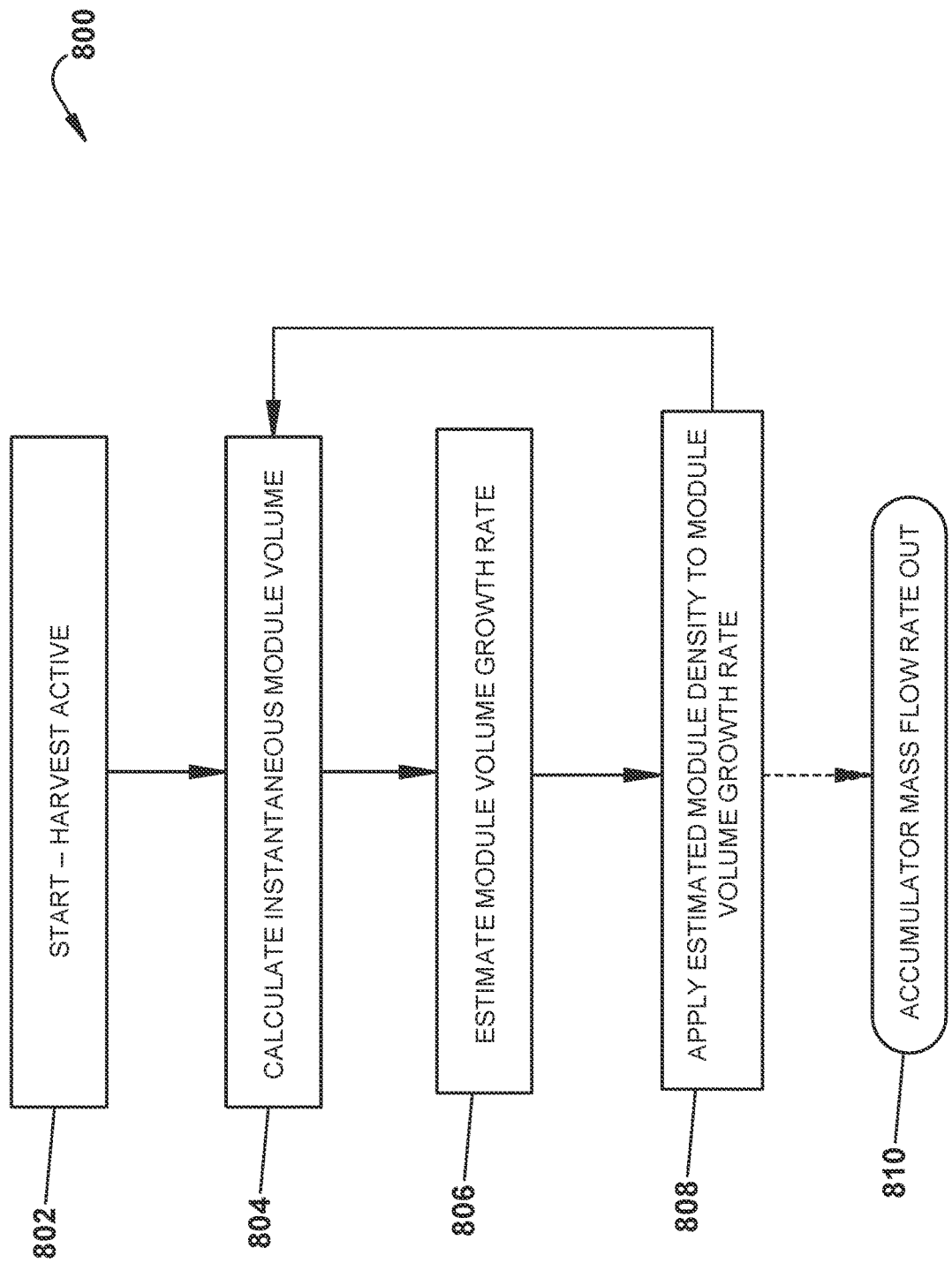
FIG. 8 is a flow diagram illustrating one implementation of an example method for converting a volumetric flow rate to a mass flow rate according to this disclosure.

FIG. 8 is a flow diagram illustrating one implementation 800 for converting a volumetric flow rate to a mass flow rate according to this disclosure. At 802, the harvester is operational and actively harvesting crop with the harvester configured to transport the harvested crop from the accumulator into the module builder to form a crop module.

At 804, is the step of calculating instantaneous module volume. The instantaneous module volume represents the amount of crop material currently in the module. At 806, is the step of estimating module volume growth rate that can be based on a least squares approximation (e.g., mm^3/sec). Any time the crop module, or bale, is growing, the module growth rate is changing and positive. At 808, is the step of applying the estimated module density (e.g., output at 722 in FIG. 7) to the module volume growth rate. Applying the estimated module density to the module volume growth rate provides the mass flow rate out of the accumulator. At 810, a signal indicative of the mass flow rate out of the accumulator is generated by the feedback fusion system. This calculated value of mass flow rate out of the accumulator is incorporated into FIG. 6 at 624 as the value of mass flow rate out.

Figure 9:
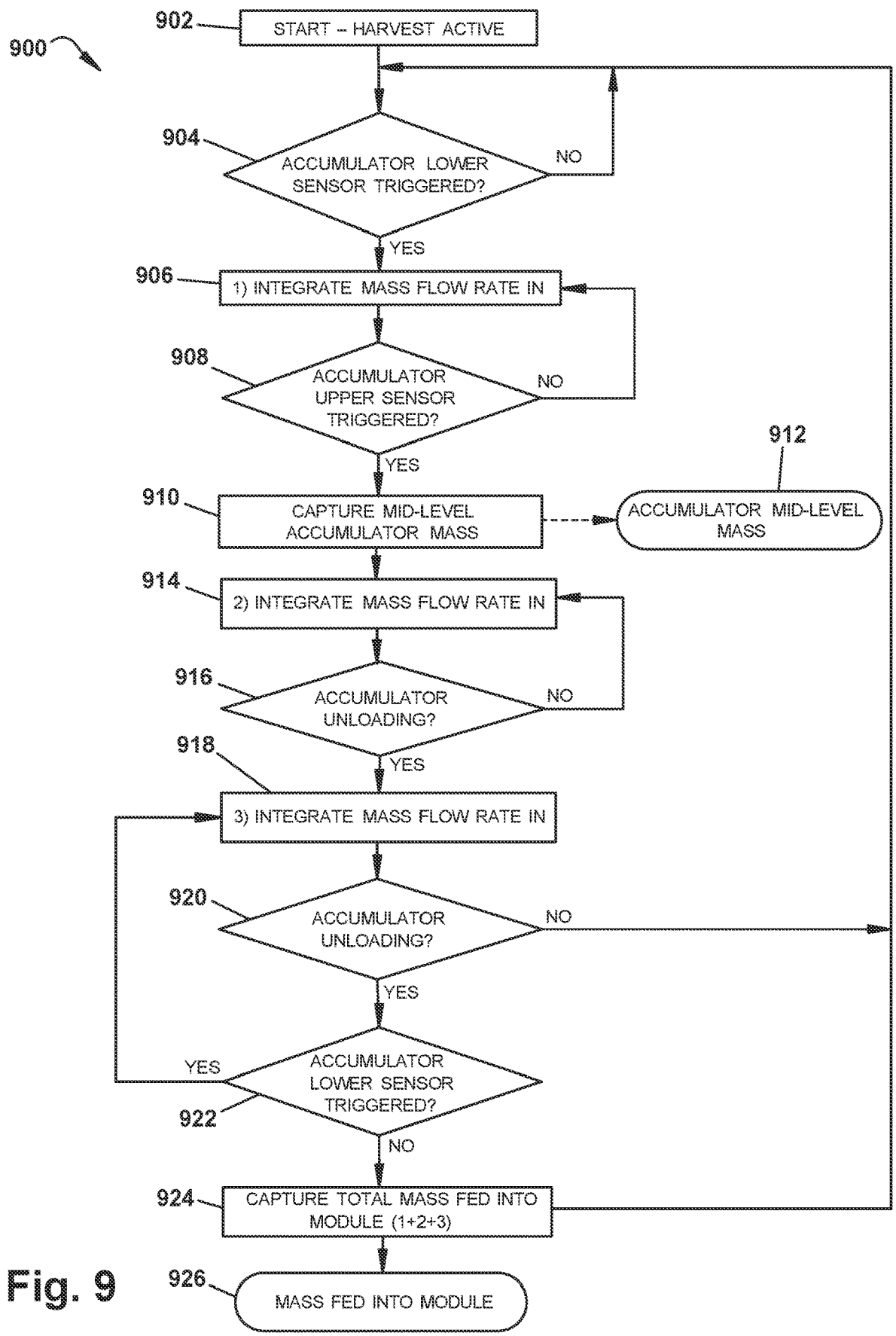
FIG. 9 is a flow diagram illustrating one implementation of an example method for determining the accumulator mid-level mass as well as the total mass fed into a module in accordance with this disclosure.

FIG. 9 is a flow diagram illustrating one implementation 900 for determining the accumulator mid-level mass as well as the total mass fed into the module in accordance with this disclosure. At 902, the harvester is operational and actively harvesting crop with the harvester configured to transport the harvested crop from the accumulator into the module builder to build a module.

At 904, the feedback fusion system monitors the lower sensor in the accumulator to determine whether the lower sensor is triggered. As an example, the lower sensor can be triggered when the crop level in the accumulator reaches a sufficient level to block the lower sensor. Once the lower sensor is triggered (e.g., blocked), there may be a series of steps to integrate mass flow rate in to the accumulator.

At 906, there is the first integration of mass flow rate in to the accumulator. At 908, there is a check to determine whether the accumulator upper sensor is triggered. As an example, the upper sensor can be triggered when the crop level in the accumulator reaches a sufficient level to block the upper sensor. Once the upper sensor is triggered, there is a data capture step.

At 910, the mid-level accumulator mass is captured after the upper sensor is triggered (e.g., blocked). The mid-level mass is defined as the mass of material, in kilograms (kg), located in the accumulator between the lower sensor and the upper sensor. At 912, a signal indicative of the accumulator mid-level mass is generated by the feedback fusion system. The mid-level mass value can be substituted into FIG. 6 at 614 or 626, depending on the situation, to estimate the accumulator fill level 616 or 628, respectively.

At 914, there is the second integration of mass flow rate into the accumulator. At 916, there is a check to determine whether the accumulator is unloading. The system continues to integrate the mass flow rate into the accumulator shown at 914 until the accumulator starts unloading. The second integration of mass flow rate into the accumulator concerns the accumulator zone between the upper sensor and the top of the accumulator. Once the accumulator starts unloading, the system still monitors and determines the amount of mass flowing into, or entering, the accumulator, which may end up in the module.

Once the accumulator starts unloading, there is a third integration of mass flow rate into the accumulator at 918. At 920, there is a check to determine whether the accumulator lower sensor is triggered. If it is determined the accumulator is not unloading, the process recycles to check whether the accumulator lower sensor is triggered, at 904. If it is determined the accumulator is unloading, there is a check to determine whether the accumulator lower sensor is triggered at 922. If the accumulator lower sensor is triggered, then the third integration of mass flow rate into the accumulator is repeated at 918. If the accumulator lower sensor is not triggered, there is a data capture step.

At 924, the total mass fed into the module is captured. The total mass fed into the module comprises the first integration of mass flow rate into the accumulator at 906, the second integration of mass flow rate into the accumulator at 914, and the third integration of mass flow rate into the accumulator at 918. The total mass fed into the module determined at 924, is then input into FIG. 7 at 718 as the value for the mass fed into the module.

Figure 10:
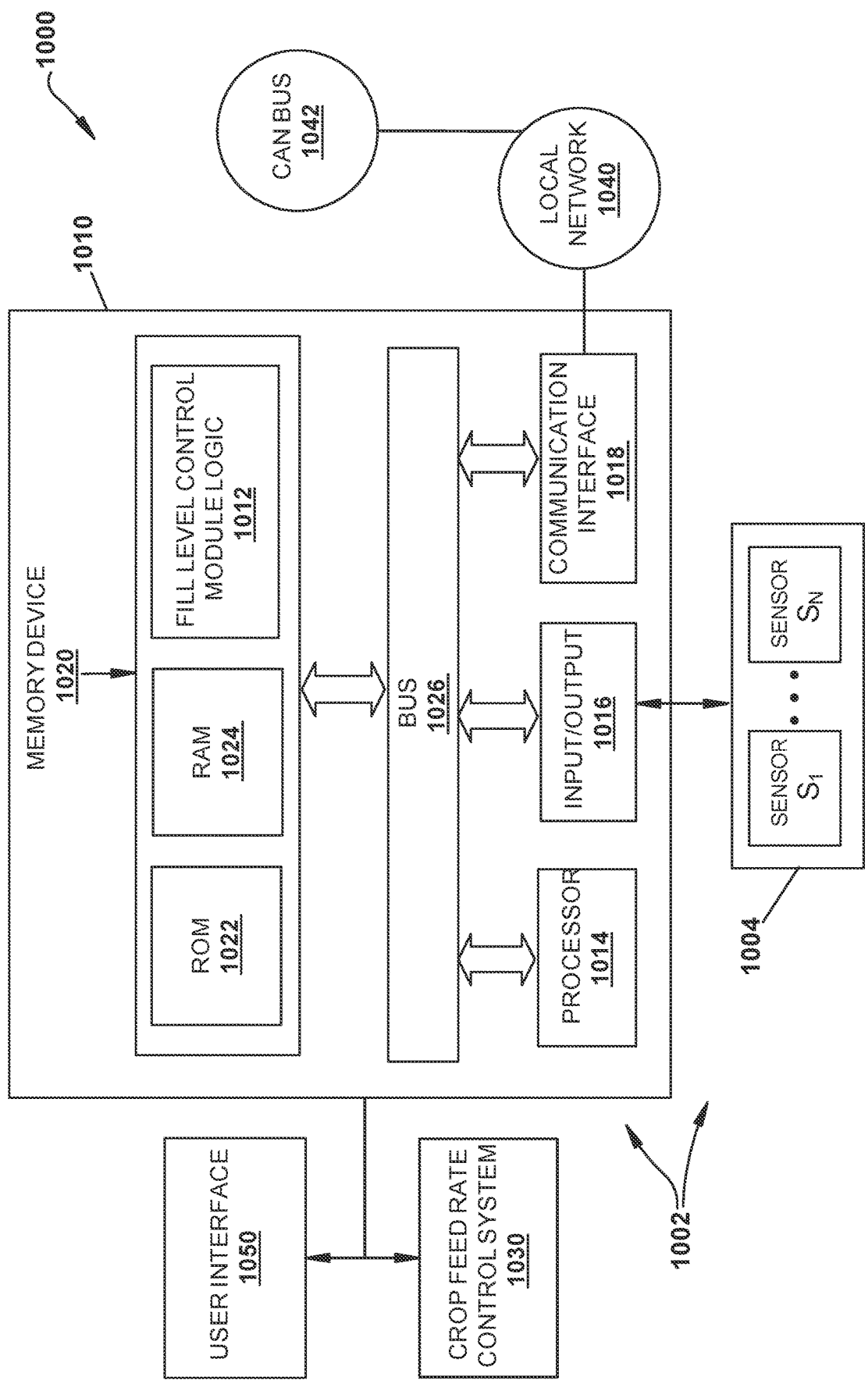
FIG. 10 is a schematic diagram illustrating an example implementation of a feedback fusion system for controlling a rate of harvesting of a harvester vehicle in accordance with this disclosure.

FIG. 10 is a schematic diagram illustrating an example implementation of a system 1000 for controlling a rate of harvesting of a harvester vehicle (e.g., 500 in FIGS. 5A and 5B). The system 1000 comprises a feedback fusion system 1002 for a harvester vehicle in which the accumulator fill level control module, configured as fill level control module logic 1012, is integrated into a control device 1010. The control device 1010, such as a programmable controller, is operably coupled with one or more feedback devices, such as sensors, collectively at 1004. The control device 1010 is also operably coupled with a crop feed rate control system 1030.

In some implementations, the one or more feedback devices, or sensors $S_1$-$S_N$, monitor data (e.g., accumulator level, mass flow, module diameter, etc.) associated with crop processing components of the crop processing system. The one or more sensors $S_1$-$S_N$ can be configured to generate a feedback signal comprising data indicative of a detected load and to operably provide said signal to the control device 1010. The detected component data can be used by the feedback fusion system 1002 to communicate a more accurate accumulator fill level to the crop feed rate control system 1030 in real time.

In some implementations, the one or more sensors $S_1$-$S_N$ can comprise mass flow sensors that are configured to monitor the mass flow into the accumulator. In some implementations, the one or more sensors $S_1$-$S_N$ can be configured to monitor a crop level in the accumulator. As an example, a lower sensor and upper sensor can be positioned in the accumulator to monitor fill level in the accumulator. In some implementations, the one or more sensors $S_1$-$S_N$ can be configured to monitor the diameter of a module and associated growth rate of the crop module. In some implementations, the one or more sensors $S_1$-$S_N$ can be configured to detect the status, or activity, of a system component. As an example, sensors can be configured to detect whether the accumulator has commenced unloading, whether the module builder is active, and whether it is the start of a module. In some implementations, the one or more sensors $S_1$-$S_N$ may be included in a sensor bank.

In some implementations, the control device 1010 comprises a processor 1014, a memory device 1020 operably coupled with the processor 1014, and fill level control module logic 1012 stored in the memory device 1020. The control device 1010 (e.g., a programmable controller) can comprise an input/output 1016 for receiving, as input, the feedback signals from the one or more sensors $S_1$-$S_N$ (collectively at 1004) and for providing, as output, crop processing data indicative of an accumulator fill level (e.g., accumulator capacity) for use by the harvester vehicle. In some implementations, the control device 1010 can be programmed to automatically provide crop processing data indicative of the accumulator fill level (e.g., accumulator capacity) to the crop feed rate control system 1030.

In some implementations, the control device 1010 can comprise a bus 1026 or other communication mechanism for communicating information (e.g., module growth rate, module diameter, mass flow rate, etc.) and a processor 1014 coupled with the bus 1026 for processing information. The control device 1010 comprises a memory device 1020 (e.g., main memory), which may comprise random access memory (RAM) 1024 or other dynamic storage devices for storing information and instructions (e.g., fill level control module logic 1012) to be executed by the processor 1014, and read only memory (ROM) 1022 or other static storage device for storing static information and instructions for the processor 1014. The main memory 1020 may be a non-volatile memory device and operable to store information and instructions executable by the processor 1014.

The feedback fusion system 1002 can comprise any type of sensor capable of monitoring data (e.g., accumulator level, machine mass flow, etc.) associated with crop processing components of the crop processing system. A non-limiting list of the types of sensors $S_1$-$S_N$ that may be utilized include: HDOC yield sensors, air speed sensors, vacuum sensors, moisture sensors, weight sensors, IR sensors, and mass flow sensors.

In some implementations, the control device 1010 can be operably coupled with a user interface 1050. In some implementations, the user interface 1050 can be configured to display information about the status of the feedback fusion system 1002. As an example, the control device 1010 can be programmed to automatically provide crop processing data associated with the accumulator fill level (e.g., module density, mass flow rate, module growth rate, etc.) as well as to provide the estimated accumulator fill level to a user interface 1050 for subsequent display and viewing by an operator.

In some implementations, the control device 1010 and, in particular a communication interface 1018, can be used to report information about the feedback fusion system 1002 to a local network 1040 and CAN bus 1042. The information can comprise any type of information concerning the feedback fusion system 1002 such as, but not limited to, component data and/or crop processing data, operating settings/parameters, and current harvesting rate (e.g., ground speed).

Figure 11:
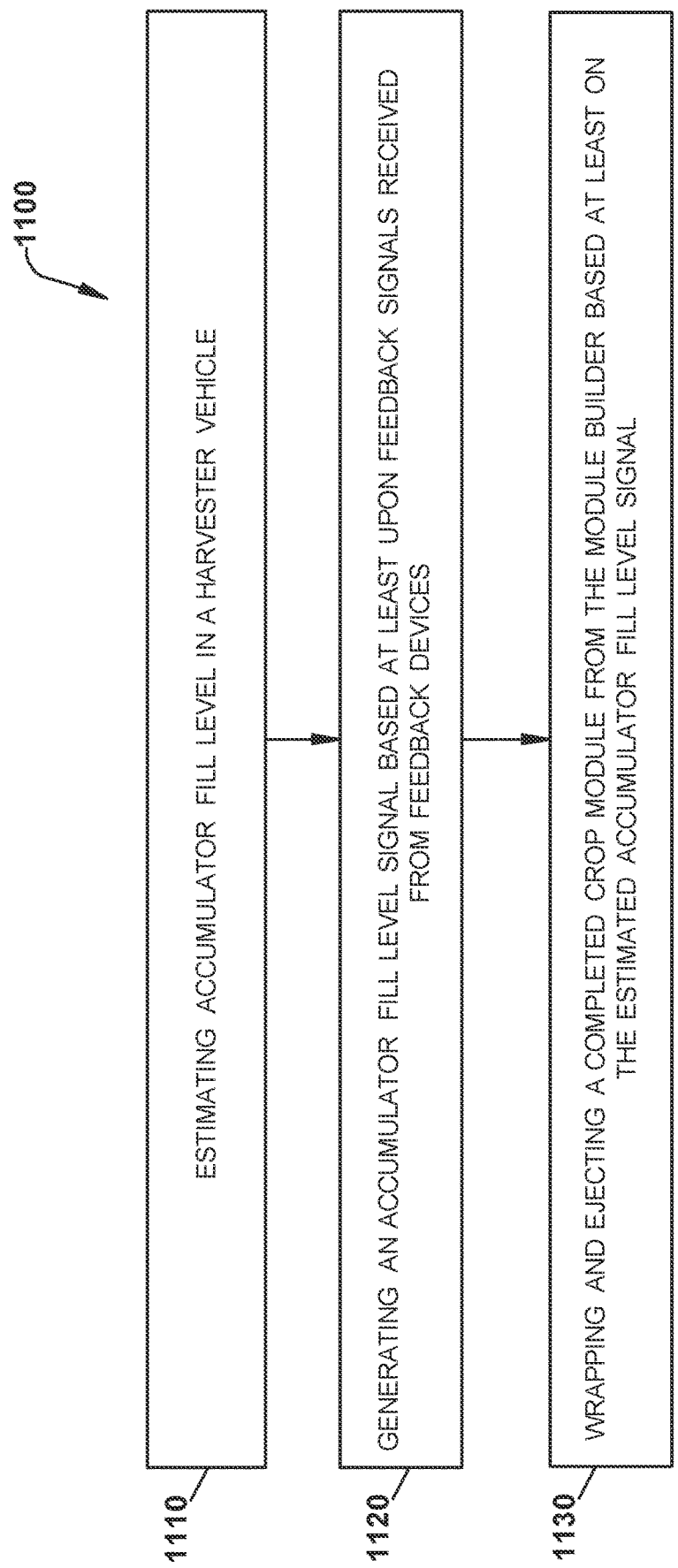
FIG. 11 is a flow diagram illustrating one implementation of a method for estimating the accumulator fill level in a harvester vehicle in accordance with this disclosure.

FIG. 11 is a flow diagram illustrating one implementation of a method 1100 for estimating accumulator fill level in a harvester vehicle (e.g., 500 in FIGS. 5A, 5B). The harvester vehicle can comprise a crop processing system comprising at least an accumulator and a module builder that operably process a harvested crop, and a feedback fusion system that estimates the fill level in the accumulator of the harvester vehicle by fusing feedback data from a plurality of feedback devices.

At 1110, the method comprises estimating the accumulator fill level in the harvester vehicle by operably providing crop processing data indicative of an accumulator fill level to the fusion feedback system. The crop processing data indicative of the accumulator fill level can be used by the feedback fusion system to operably control activation and deactivation of a wrap-and-eject cycle.

At 1120, the estimating comprises generating an accumulator fill level signal indicative of the estimated fill level in the accumulator. The accumulator fill level signal can be based at least on two or more feedback signals received from the plurality of feedback devices. The feedback signals can comprise data indicative of: crop mass flow, module builder status, module size, and accumulator fill level.

At 1130, the estimating comprises wrapping and ejecting a completed crop module from the module builder based at least on the estimated accumulator fill level signal.

In some implementations of the method, at least one of the plurality of feedback devices comprises a lower sensor and an upper sensor that are configured to detect the accumulator fill level and to operably provide a feedback signal comprising data indicative of the fill level within the accumulator.

In some implementations of the method, at least one of the plurality of feedback devices is configured to monitor crop mass flow into the accumulator and to operably provide a feedback signal comprising data indicative of the crop mass flow into the accumulator.

In some implementations of the method, at least one of the plurality of feedback devices is configured to detect size of a crop module and to operably provide a feedback signal comprising data indicative of the crop module size, wherein the size of the crop module comprises a diameter of the crop module and an associated growth rate of the crop module.

In some implementations of the method, at least one of the plurality of feedback devices is configured to monitor module builder status and to operably provide a feedback signal comprising data indicative of the module builder status, wherein the module builder status can comprise data indicating the stage of module formation which is used to perform module mass correction.

In some implementations of the method, the feedback fusion system generates the accumulator fill level signal indicative of the estimated fill level in the accumulator at least based upon the feedback signals comprising data indicative of crop mass flow and accumulator fill level.

In still some implementations of the method, the wrap-and-eject cycle is triggered by any one or more of the following: a target crop module size threshold is met; and a target crop module mass threshold is met.

In some implementations of the method, the feedback fusion system is operably coupled with a crop feed rate control system, wherein the crop feed rate control system operably provides crop processing data indicative of a target harvesting rate to a vehicle control system to operably control the harvesting rate of the harvester vehicle, the crop processing data indicative of the target harvesting rate based at least on the crop processing data indicative of the accumulator fill level.

The feedback fusion system disclosed herein provides for a more accurate estimation of the accumulator fill level by combining, or fusing, the data provided by a plurality of feedback devices. By combining multiple inputs in estimating the accumulator fill level, the control logic of the feedback fusion system is more robust than a traditional system that relies solely on estimating the time to fill the accumulator along with an accumulator that is sized, as a target, to reach full when the wrap and eject cycle is ready. Such crude logic works well in low yield situations, but can experience issues in high yield scenarios when the accumulator is filling faster than the wrap-and-eject cycle.

By taking into account the crop mass flow into the accumulator tracked via mass flow sensors, and the crop mass flow out of the accumulator calculated based on the growth rate of the crop module the feedback fusion system described herein is more robust and provides a more accurate determination of accumulator fill level. Moreover, the lower and upper sensors incorporated in the system provide distinct reference points to allow the harvester machine and corresponding logic to react to varying field conditions and grow intelligent over time via machine learning. In other words, the feedback fusion system is envisioned to adapt to changing conditions on its own regarding different types of crop being harvested and/or the conditions of the crops (e.g., variety, moisture level, yield, etc.).

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A harvester vehicle comprising:
    a crop processing system comprising at least an accumulator and a module builder operable to form a crop module from crop fed to the module builder from the accumulator; and
    a feedback fusion system that operably provides crop processing data indicative of an accumulator fill level to a crop feed rate control system of the harvester vehicle, the feedback fusion system comprising:
        a plurality of sensors that operably provide feedback signals comprising data indicative of:
            a crop mass flow into the accumulator;
            a module builder status; and
            a crop module size comprising a diameter and associated growth rate of the crop module formed by the module builder; and a control module operable to generate an accumulator fill level signal indicative of an estimated fill level in the accumulator based on:
the crop mass flow into the accumulator;
the module builder status; and
the crop module size comprising the diameter and associated growth rate of the crop module formed by the module builder.

2. The harvester vehicle of claim 1, wherein at least one of the plurality of sensors is configured to detect the accumulator fill level and to operably provide a feedback signal comprising data indicative of the fill level within the accumulator.

3. The harvester vehicle of claim 2, wherein the plurality of sensors comprises a lower sensor disposed in a lower portion of the accumulator and operable to provide a feedback signal representative of a lower fill level of the accumulator and an upper sensor disposed in an upper portion of the accumulator and operable to provide a feedback signal representative of an upper fill level of the accumulator.

4. The harvester vehicle of claim 3, wherein the feedback fusion system generates the accumulator fill level signal indicative of the estimated fill level in the accumulator at least based upon the feedback signals comprising data indicative of crop mass flow and accumulator fill level based on a mid-level mass of the crop comprising the mass of crop material disposed between the lower sensor and the upper sensor.

5. The harvester vehicle of claim 1, wherein at least one of the plurality of sensors is configured to monitor the crop mass flow into the accumulator and to operably provide a feedback signal comprising data indicative of the crop mass flow into the accumulator.

6. The harvester vehicle of claim 1, wherein the feedback fusion system is operable to trigger a wrap-and-eject cycle by any one or more of:
a target crop module size threshold is met; and
a target crop module mass threshold is met.

7. The harvester vehicle of claim 1, wherein the crop processing system is operable to wrap and eject a completed module from the module builder based at least on the accumulator fill level signal.

8. The harvester vehicle of claim 1, further comprising a crop feed rate control system operable to provide crop processing data indicative of a target harvesting rate to a vehicle control system to operably control a harvesting rate of the harvester vehicle, the crop processing data indicative of the target harvesting rate based at least on the crop processing data indicative of the accumulator fill level.

9. A method of operating a harvester vehicle having a crop processing system comprising at least an accumulator and a module builder operable to form a crop module from harvested crop fed to the module builder from the accumulator, and a feedback fusion system that estimates a fill level in the accumulator of the harvester vehicle by fusing feedback data from a plurality of sensors, the method comprising:
estimating an accumulator fill level in the harvester vehicle by operably providing crop processing data indicative of an accumulator fill level to the fusion feedback system, the crop processing data indicative of the accumulator fill level used by the feedback fusion system to operably control activation and deactivation of a wrap-and-eject cycle, the estimating comprising:
generating a plurality of feedback signals by the plurality of sensors, the plurality of feedback signals comprising data indicative of:
a crop mass flow into the accumulator;
a module builder status; and
a crop module size comprising a diameter and associated growth rate of the crop module as it is being formed by the module builder; and
generating an accumulator fill level signal indicative of an estimated fill level in the accumulator based on:
the crop mass flow into the accumulator;
the module builder status; and
the crop module size comprising the diameter and associated growth rate of the crop module as it is being formed by the module builder; and
wrapping and ejecting a completed crop module from the module builder based at least on the accumulator fill level signal.

10. The method of claim 9, wherein at least one of the plurality of sensors comprises a lower sensor providing a feedback signal representative of a lower fill level of the accumulator and an upper sensor providing a feedback signal representative of an upper fill level of the accumulator, wherein the upper and lower sensors are configured to detect the accumulator fill level and to operably provide a feedback signal comprising data indicative of the accumulator fill level.

11. The method of claim 9, wherein at least one of the plurality of sensors is configured to monitor module builder status and to provide a feedback signal comprising data indicative of a stage of module formation which is used to perform module mass correction.

12. The method of claim 9, wherein the feedback fusion system generates the accumulator fill level signal indicative of the estimated fill level in the accumulator at least based upon the feedback signals comprising data indicative of a mid-level mass of the crop comprising the mass of crop material disposed between a lower sensor and an upper sensor.

13. The method of claim 9, further comprising triggering a wrap-and-eject cycle by any one or more of:
a target crop module size threshold is met; and
a target crop module mass threshold is met.

14. The method of claim 9, further comprising providing crop processing data indicative of a target harvesting rate to a vehicle control system to operably control a harvesting rate of the harvester vehicle, the crop processing data indicative of the target harvesting rate based at least on the crop processing data indicative of the accumulator fill level.

15. A system for estimating the accumulator fill level of a vehicle harvester, the system comprising:
a crop processing system comprising at least an accumulator and a module builder;
a feedback fusion system that operably provides crop processing data indicative of an accumulator fill level to a crop feed rate control system, the feedback fusion system comprising:
a plurality of sensors comprising:
at least one sensor configured to monitor crop mass flow into the accumulator and to operably provide a feedback signal comprising data indicative of the crop mass flow into the accumulator;
at least one sensor configured to detect size and growth rate of a crop module as it is being formed and to operably provide a feedback signal comprising data indicative of a crop module size and growth rate;
at least one sensor configured to monitor module builder status and to operably provide a feedback signal comprising data indicative of the module builder status, wherein the module builder status comprises data indicating a stage of module formation which can be used to perform module mass correction; and a control module operable to receive the feedback signals and generate an accumulator fill level signal based at least upon the crop module size and growth rate, the module builder status, and the crop mass flow into the accumulator, the accumulator fill level signal being indicative of an estimated fill level in the accumulator, wherein the crop processing system is operable to wrap and eject a completed module from the module builder based at least on the accumulator fill level signal.

16. The system according to claim 15, wherein
the control module is operable to generate the accumulator fill level signal based on a mid-level mass of the crop comprising mass of crop material disposed between a lower sensor and an upper sensor.

17. The system according to claim 15, wherein
the control module is operable to generate the accumulator fill level signal based on a relation between the crop mass flow into the accumulator and a mid-level mass of the crop comprising mass of crop material disposed between a lower sensor and an upper sensor.

18. The system according to claim 15, wherein
the control module is operable to generate the accumulator fill level signal based on a relation between the crop mass flow into the accumulator, a determined crop mass flow out of the module builder, and a mid-level mass of the crop comprising mass of crop material disposed between a lower sensor and an upper sensor.

* * * * *